(12) United States Patent
Zhang et al.

(10) Patent No.: US 12,506,996 B2
(45) Date of Patent: Dec. 23, 2025

(54) ACOUSTIC APPARATUS

(71) Applicant: SHENZHEN SHOKZ CO., LTD., Guangdong (CN)

(72) Inventors: Haofeng Zhang, Shenzhen (CN); Jiang Xu, Shenzhen (CN); Zeying Zheng, Shenzhen (CN); Yonggen Wang, Shenzhen (CN); Liwei Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 345 days.

(21) Appl. No.: 18/163,869

(22) Filed: Feb. 2, 2023

(65) Prior Publication Data

US 2023/0179907 A1 Jun. 8, 2023

Related U.S. Application Data

(63) Continuation of application No. PCT/CN2021/132569, filed on Nov. 23, 2021.

(30) Foreign Application Priority Data

Nov. 24, 2020 (CN) .......................... 202011328519.4

(51) Int. Cl.
H04R 1/10 (2006.01)
(52) U.S. Cl.
CPC .................................... H04R 1/105 (2013.01)
(58) Field of Classification Search
CPC ...................................................... H04R 1/105
(Continued)

(56) References Cited

U.S. PATENT DOCUMENTS 6,418,230 B1 * 7/2002 McDonald ............... H04R 1/10
379/426
6,449,374 B1 9/2002 Skulley et al.
(Continued)

FOREIGN PATENT DOCUMENTS

CN 1259840 A 7/2000
CN 107920293 A 4/2018
(Continued)

OTHER PUBLICATIONS

The Notice of Reasons for Refusal in Japanese Application No. 2023-517986 mailed on Apr. 30, 2024, 10 pages.
(Continued)

*Primary Examiner* — Suhan Ni
(74) *Attorney, Agent, or Firm* — METIS IP LLC

(57) ABSTRACT

The present disclosure provides an acoustic apparatus. The acoustic apparatus may include a hook-shaped part, a connecting part, and a holding part. When a user is wearing the acoustic apparatus, the hook-shaped part may be hung between a first side of an ear and a head of the user, the holding part may be in contact with a second side of the ear, and the connecting part may be connected with the hook-shaped part and the holding part. The hook-shaped part may include a first portion and a second portion, the first portion may be connected with the connecting part, and the second portion may be connected with the first portion. A projection of the first portion on a sagittal plane of the user may include a first curve. A projection of the second portion on the sagittal plane of the user may include a second curve.

20 Claims, 6 Drawing Sheets

(58) Field of Classification Search
USPC .......................................................... 381/381
See application file for complete search history.

(56) References Cited

U.S. PATENT DOCUMENTS

| | | | |
|---|---|---|---|
| 7,120,268 | B2 | 10/2006 | Murozaki et al. |
| 8,374,376 | B2* | 2/2013 | Kurbis ................... H04R 1/083 |
| | | | 381/381 |
| 10,609,496 | B2 | 3/2020 | Liao et al. |
| 10,827,246 | B1 | 11/2020 | Oommen et al. |
| 2008/0298626 | A1 | 12/2008 | Dean |
| 2009/0095566 | A1 | 4/2009 | Leong et al. |
| 2010/0061581 | A1* | 3/2010 | Soetejo ................... H04R 1/105 |
| | | | 381/380 |
| 2011/0164778 | A1 | 7/2011 | Wengreen |
| 2016/0073963 | A1 | 3/2016 | Lin et al. |
| 2017/0034611 | A1 | 2/2017 | Maruyama |
| 2017/0245037 | A1 | 8/2017 | Willis et al. |
| 2019/0149905 | A1 | 5/2019 | Schmitt et al. |
| 2019/0261077 | A1 | 8/2019 | Dominijanni et al. |
| 2020/0267464 | A1 | 8/2020 | Graff et al. |
| 2020/0280783 | A1 | 9/2020 | Dominijanni et al. |
| 2020/0314518 | A1* | 10/2020 | Hatfield ............... H04R 1/1041 |
| 2022/0007098 | A1 | 1/2022 | Chen et al. |

FOREIGN PATENT DOCUMENTS

| | | |
|---|---|---|
| CN | 111541972 A | 8/2020 |
| CN | 111935588 A | 11/2020 |
| EP | 2303205 B1 | 9/2015 |
| JP | S58172292 U | 11/1983 |
| JP | H11298982 A | 10/1999 |
| JP | 2000201389 A | 7/2000 |
| JP | 2009239580 A | 10/2009 |
| JP | 2015070468 A | 4/2015 |
| WO | 2009106151 A1 | 9/2009 |
| WO | 2009147370 A1 | 12/2009 |
| WO | 2010116510 A1 | 10/2010 |
| WO | 2020051497 A1 | 3/2020 |
| WO | 2021133679 A1 | 7/2021 |

OTHER PUBLICATIONS

First Examination Report in Indian Application No. 202317008641 mailed on Nov. 2, 2023, 6 pages.
First Office Action in Russian Application No. 2023103228 mailed on Jun. 26, 2023, 14 pages.
The Extended European Search Report in European Application No. 21896986.3 mailed on Dec. 8, 2023, 13 pages.
International Search Report in PCT/CN2021/132569 mailed on Feb. 23, 2022, 7 pages.
Written Opinion in PCT/CN2021/132569 mailed on Feb. 23, 2022, 10 pages.

* cited by examiner

ACOUSTIC APPARATUS

CROSS-REFERENCE TO RELATED APPLICATIONS

This application is a Continuation of International Application No. PCT/CN2021/132569 filed on Nov. 23, 2021, which claims priority to Chinese Application No. 202011328519.4 filed on Nov. 24, 2020, the entire contents of which are incorporated herein by reference.

TECHNICAL FIELD

The present disclosure relates to the field of acoustics, in particular to acoustic apparatus.

BACKGROUND

With the development of acoustic output technology, acoustic output apparatus (e.g., earphones) have been widely used in people's daily life, which can be used in conjunction with electronic devices such as mobile phones and computers to provide users with an auditory feast. According to the way of the user wears, the acoustic apparatus generally be divided into a head-mounted type, an ear-hook type, and an in-ear type. The wearing comfort and stability of the acoustic apparatus will greatly affect the user's choice and experience.

Therefore, it is necessary to provide an acoustic apparatus to improve the wearing comfort of the user and the wearing stability of the acoustic apparatus.

SUMMARY

An aspect of the present disclosure relates to an acoustic apparatus. The acoustic apparatus may include a hook-shaped part, a connecting part, and a holding part. When a user is wearing the acoustic apparatus, the hook-shaped part may be hung between a first side of an ear and a head of the user, the holding part may be in contact with a second side of the ear, and the connecting part may be connected with the hook-shaped part and the holding part. The hook-shaped part may include a first portion and a second portion, the first portion may be connected with the connecting part, and the second portion may be connected with the first portion. A projection of the first portion on a sagittal plane of the user may include a first curve. A projection of the second portion on the sagittal plane of the user may include a second curve. The first curve may include a first extremum point in a first direction, and the second curve may include a second extremum point in the first direction. The first direction may be perpendicular to a horizontal plane of the user. A connection point between the first curve and the second curve may be an intersection point between a bottom edge of the holding part away from the connecting part along the first direction and a projection of the hook-shaped part on the sagittal plane of the user.

In some embodiments, the first extremum point may be a maximum point of the first curve in the first direction; and the second extremum point may be a minimum point of the second curve in the first direction.

In some embodiments, when the user is wearing the acoustic apparatus, a pressing force of the first portion on the first side of the ear may be greater than a pressing force of the second portion on the first side of the ear, and a friction force of the second portion on the first side of the ear may be greater than a friction force of the first portion on the first side of the ear.

In some embodiments, a first pressing force on the first side of the ear along a direction perpendicular to the sagittal plane of the user by a position on the hook-shaped part corresponding to the first extremum point may be within a range from 0.05 Newton (N) to 3 N.

In some embodiments, a second pressing force on the first side of the ear along a direction perpendicular to a coronal plane of the user by a position on the hook-shaped part corresponding to the connection point between the first curve and the second curve may be within a range from 0.05 N to 3 N.

In some embodiments, a distance between a first edge of the holding part close to the first extremum point and the first extremum point in a projection on the sagittal plane of the user may be within a range from 5 millimeters (mm) to 15 mm.

In some embodiments, a contact region may include at least a first contact point, a second contact point, and a third contact point. The first contact point may coincide with the first extremum point, the second contact point may coincide with the connection point between the first curve and the second curve, and the third contact point may coincide with the second extremum point.

In some embodiments, the first portion may include one or more contact regions that are in contact with the first side of the ear and one or more non-contact regions that are not in contact with the first side of the ear.

In some embodiments, a distance between each of the one or more non-contact regions and the first side of the ear may not exceed 5 mm.

In some embodiments, a contact region of the second portion in contact with the first side of the ear may further include a fourth contact point, and the fourth contact point may be located between the connection point between the first curve and the second curve and the second extremum point.

In some embodiments, a size of the connecting part along the first direction may be within a range from 0.56 mm to 4.56 mm.

In some embodiments, a size of the connecting part along the direction perpendicular to the sagittal plane of the user may be within a range from 2.5 mm to 4.5 mm.

In some embodiments, the acoustic apparatus may further include a plastic part capable of being plastically deformed to fit the ear of the user.

In some embodiments, the plastic part may be disposed on the first portion of the hook-shaped part.

In some embodiments, the plastic part may be located between the holding part and the first portion in the direction perpendicular to the sagittal plane of the user.

In some embodiments, the plastic part may have a plastic deformation force. When a force on the plastic part exceeds the plastic deformation force, the plastic part may undergo a plastic deformation, and a deformation recovery amount of the plastic deformation may be less than 20%.

In some embodiments, the plastic deformation force may include a first plastic deformation force, and the first plastic deformation force may be within a range from 0.3 N to 10 N.

In some embodiments, the plastic deformation force may include a second plastic deformation force, and the second plastic deformation force may be within a range from 10 N to 100 N.

In some embodiments, when the plastic part satisfies a preset condition, the plastic deformation force may be transformed from the second plastic deformation force to the first plastic deformation force.

In some embodiments, a material of the plastic part may include a thermoplastic polymer material.

BRIEF DESCRIPTION OF THE DRAWINGS

The present disclosure may be further described by way of exemplary embodiments, which may be described in detail by means of the accompanying drawings. These embodiments are not limiting, and in these embodiments, the same numbers refer to the same structures, wherein.

DETAILED DESCRIPTION

Figure 1:
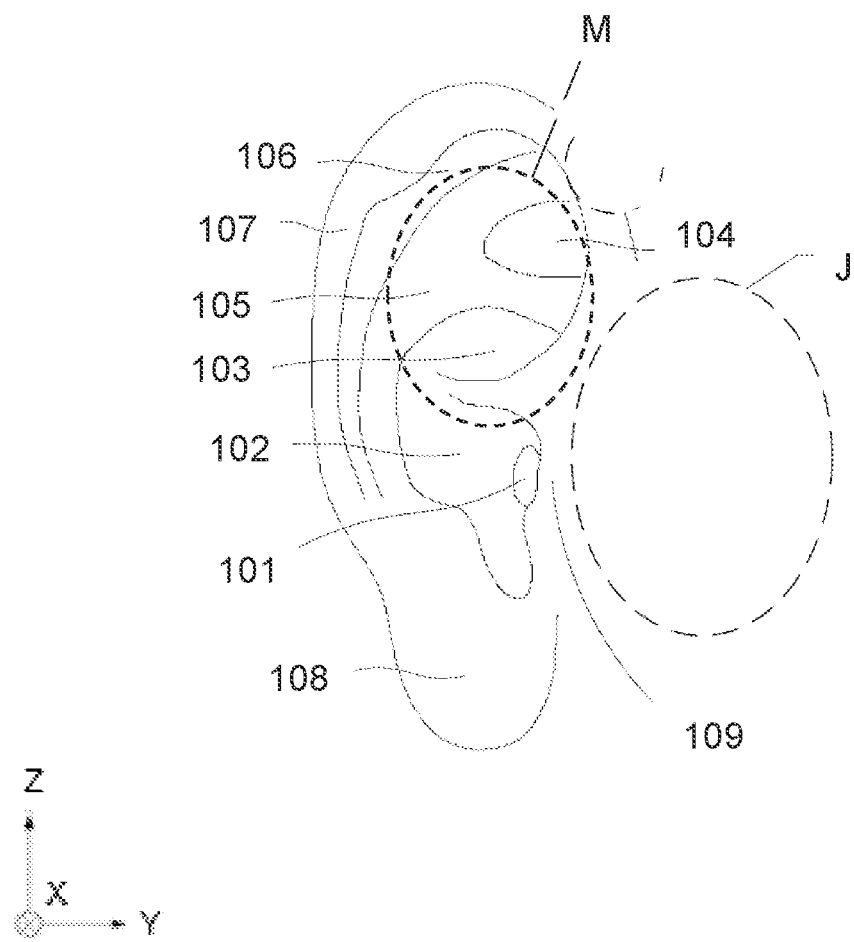
FIG. 1 is a schematic diagram illustrating an exemplary ear according to some embodiments of the present disclosure.

In order to more clearly illustrate the technical solutions of the embodiments of the present the present disclosure, the following briefly introduces the drawings that need to be used in the description of the embodiments. Obviously, drawings described below are only some examples or embodiments of the present disclosure. Those having ordinary skills in the art, without further creative efforts, may apply the present disclosure to other similar scenarios according to these drawings. Unless otherwise apparent from context or otherwise indicated, like reference numerals in the figures represent like structures or operations.

It will be understood that the term "system," "engine," "unit," "module," and/or "block" used herein are one method to distinguish different components, elements, parts, sections, or assembly of different levels in ascending order. However, if other words serve the same purpose, the words may be replaced by other expressions.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

FIG. 1 is a schematic diagram illustrating an exemplary ear according to some embodiments of the present disclosure.

Referring to FIG. 1, an ear 100 may include an external ear canal 101, a cavity of auricular concha 102, a cymba of auricular concha 103, a triangular fossa 104, an antihelix 105, a scapha 106, a helix 107, an auricular lobule 108, and a crus of helix 109. In some embodiments, the wearing and stabilization of an acoustic apparatus may be accomplished with one or more parts of the ear 100. In some embodiments, the external ear canal 101, the cavity of auricular concha 102, the cymba of auricular concha 103, the triangular fossa 104, and other parts may have a certain depth and volume in a three-dimensional space, which may be used to meet wearing requirement(s) of the acoustic apparatus. For example, the acoustic apparatus (e.g., in-ear earphones) may be worn in the external ear canal 101. In some embodiments, the wearing of the acoustic apparatus may be implemented using parts of the ear 100 other than the external ear canal 101. For example, the wearing of the acoustic apparatus may be implemented using the cymba of auricular concha 103, the triangular fossa 104, the antihelix 105, the scapha 106, the helix 107, or the like, or any combination thereof. In some embodiments, the auricular lobule 108 and other parts of a user may be further used to improve the wearing comfort and reliability of the acoustic apparatus. By using other parts of the ear 100 other than the external ear canal 101 to implement the wearing of the acoustic apparatus and the transmission of sound, the external ear canal 101 of the user may be "liberated," and an impact of the acoustic apparatus on the ear health of the user may be reduced. When the user is wearing the acoustic apparatus on a road, the acoustic apparatus may not block the external ear canal 101 of the user, and the user may receive both the sound from the acoustic apparatus and the sound from the environment (e.g., a whistle, a car bell, a voice of surrounding people, a traffic command sound, etc.), thereby reducing the probability of traffic accidents. For example, when the user is wearing the acoustic apparatus, the whole or a portion of the structure of the acoustic apparatus may be located on a front side of the crus of helix 109 (e.g., a region J enclosed by a dotted line in FIG. 1). As another example, when the user is wearing the acoustic apparatus, the whole or a portion of the structure of the acoustic apparatus may be in contact with an upper part (e.g., the crus of helix 109, the cymba of auricular concha 103, the triangular fossa 104, the antihelix 105, the scapha 106, the helix 107, etc., where one or more parts are located) of the external ear canal 101. As still another example, when the user is wearing the acoustic apparatus, the whole or a portion of the structure of the acoustic apparatus may be located inside one or more parts (e.g., the cavity of auricular concha 102, the cymba of auricular concha 103, the triangular fossa 104, etc.) of the ear (e.g., a region M enclosed by a dotted line in FIG. 1).

The above descriptions of the ear 100 are merely provided for the purposes of illustration, and are not intended to limit the scope of the present disclosure. For those skilled in the art, various changes and modifications may be made according to the descriptions of the present disclosure. For example, the structure, shape, size, thickness, etc., of one or more parts of the ear 100 may be different for different users. As another example, a portion of the structure of the acoustic apparatus may shield part or all of the external ear canal 101. These changes and modifications are still within the protection scope of the present disclosure.

Figure 2:
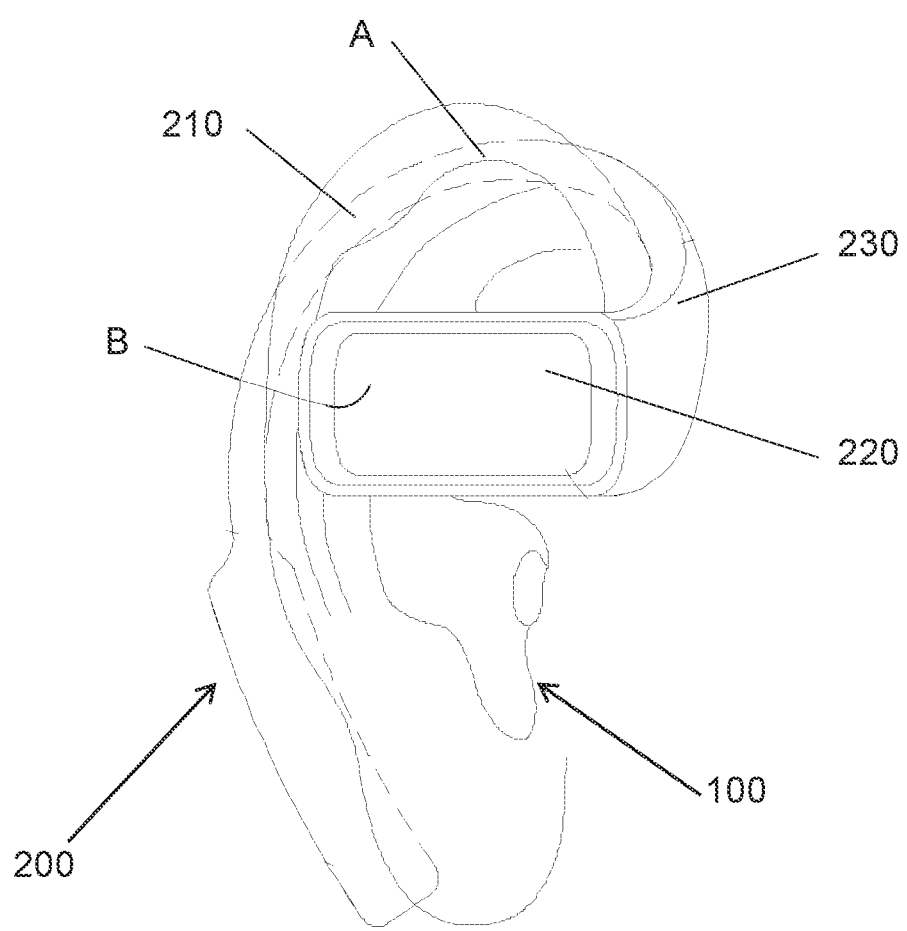
FIG. 2 is a schematic diagram illustrating a front side view when a user is wearing an exemplary acoustic apparatus according to some embodiments of the present disclosure.
Figure 2:
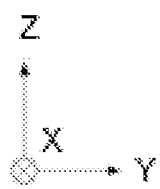

FIG. 2 is a schematic diagram illustrating a front side view when a user is wearing an exemplary acoustic apparatus according to some embodiments of the present disclosure. It should be noted that, a plane shown in FIG. 2 is parallel or substantially parallel to a sagittal plane of the user when the user is wearing the acoustic apparatus.

In some embodiments, an acoustic apparatus 200 may include a hook-shaped part 210, a holding part 220, and a connecting part 230. In some embodiments, referring to FIG. 2, when the user is wearing the acoustic apparatus 200, the hook-shaped part 210 of the acoustic apparatus 200 may be located on a first side of the ear 100 of the user (e.g., a side of the ear 100 of the user facing the head of the user, which may also be referred to as a back side of the ear 100), and may be at least partially in contact with the ear 100. The holding part 220 may be located on a second side of the ear 100 of the user (e.g., a side of the ear 100 of the user facing away from the head of the user, which may also be referred to as a front side of the ear 100), and may be at least partially in contact with the ear 100. The connecting part 230 may be connected between the hook-shaped part 210 and the holding part 220. The connecting part 230 may extend from a position between the ear 100 and the head of the user to the second side of the ear 100.

In some embodiments, when the user is wearing the acoustic apparatus 200, the hook-shaped part 210 may include one or more contact regions (e.g., a contact region A) that are in contact with the ear of the user, and the holding part 220 may also include one or more contact regions (e.g., a contact region B) that are in contact with the ear of the user, thereby "clamping" the acoustic apparatus 200 on the ear of the user. In some embodiments, a distance (e.g., a distance along an extending direction of the connecting part 230) between the one or more contact regions (e.g., the contact region A) on the hook-shaped part 210 and the one or more contact regions (e.g., the contact region B) on the holding part 220 when the user is not wearing the acoustic apparatus 200 may be smaller than that when the user is wearing the acoustic apparatus 200. Therefore, when the user is wearing the acoustic apparatus 200, the hook-shaped part 210 and the holding part 220 may cooperate with each other to provide pressing forces facing the first side and the second side of the ear 100, respectively, thereby "clamping" the acoustic apparatus 200 on the ear 100.

To improve the firmness when the user is wearing the acoustic apparatus 200, the pressing force provided by the hook-shaped part 210 and the holding part 220 on the first side and the second side of the ear 100 may not be set too small. However, if the pressing force is excessive, the discomfort may be caused to the ear when the user is wearing the acoustic apparatus 200. Therefore, in some embodiments, a count of the contact regions of the hook-shaped part 210 and the holding part 220 in contact with the ear 100 may be set as high as possible. Alternatively, a total contact area of the one or more contact regions may be set as large as possible. Therefore, the pressing force of the acoustic apparatus 200 on the ear 100 may be dispersed to different contact positions of the ear, and the discomfort caused by a sizeable local force (or pressure) on the ear 100 may be reduced. In some embodiments, surfaces of the hook-shaped part 210 and the holding part 220 corresponding to the ear 100 of the user may be designed to completely fit the ear 100 of the user, so that contact areas of the hook-shaped part 210 and the holding part 220 in contact with the ear 100 may be as large as possible, respectively, thereby reducing the pressure on the ear 100. However, since different types of users include different ear shapes, the surfaces of the hook-shaped part 210 and the holding part 220 corresponding to the ear 100 of the user may be difficult to be designed to completely fit the ear 100 of the user of any type (e.g., a man, a woman, or a child). For example, certain users may have shallower depths of the cymba of auricular concha 103, while other users may have deeper depths of the cymba of auricular concha 103. If the hook-shaped part 210 is designed to fit a back surface (i.e., the first side) of the cymba of auricular concha 103 of the certain users with the shallower depth, when the other users with the deeper depth of the cymba of auricular concha 103 are wearing the acoustic apparatus 200, since the cymba of auricular concha 103 with the deeper depth has a larger bulge on the first side, the hook-shaped part 210 may be propped up at the bulge. Therefore, other regions of the ear 100 may be difficult to be in contact with the hook-shaped part 210. In such case, the contact area between the hook-shaped part 210 and the ear 100 may be reduced. Therefore, in some embodiments, the hook-shaped part 210 may be disposed with the one or more non-contact regions that are not in contact with the ear 100. The one or more non-contact regions may correspond to specific regions or more protruding regions of ears of different types of users, which may avoid reducing the contact area between the hook-shaped part 210 and the ear 100 due to different ear shapes of different types of users. Therefore, different types of users may have the good comfort when the acoustic apparatus 200 is worn.

In some embodiments, in order to better match the acoustic apparatus 200 (especially the hook-shaped part 210) to ear shapes of more users, the hook-shaped part 210 may be designed with a unique curve to meet comfort requirement (s) when the user is wearing the acoustic apparatus 200. In some embodiments, the hook-shaped part 210 may include a first portion and a second portion with different curves. The different curves may cause the first portion and the second portion to fit differently with the ear of the user. Therefore, the hook-shaped part 210 of the acoustic apparatus 200 may adapt to the ear shapes of more users, thereby improving the comfort when the user is wearing the acoustic apparatus 200.

In some embodiments, by disposing the one or more contact regions that are in contact with the ear 100 and the one or more non-contact regions that are not in contact with the ear 100 on the hook-shaped part 210, the comfort of different types of users may be improved while taking into account the stability of the users when the users are wearing the acoustic apparatus 200. More descriptions about the one or more contact regions that are in contact with the ear and the one or more non-contact regions that are not in contact with the ear on the hook-shaped part 210 may be found elsewhere in the present disclosure (e.g., FIG. 6 and the descriptions thereof).

In some embodiments, in order to cause the hook-shaped part 210 to be in contact with the ear 100 as much as possible when the different types of users are wearing the acoustic apparatus 200, the acoustic apparatus 200 may further include a plastic part connected with the hook-shaped part 210. The plastic part may be disposed between the hook-shaped part 210 and the ear 100. The plastic part may be plastically deformed when the plastic part is subjected to an external force. Therefore, the plastic part may be deformed into a shape consistent with a contour of the ear 100, thereby increasing the contact area between the acoustic apparatus 200 and the ear 100, and dispersing the pressing force received by the ear 100 from the acoustic apparatus 200. By disposing the plastic part, the acoustic apparatus 200 may adapt to an ear shape of any type of user, thereby improving the universality of the acoustic apparatus 200.

In order to describe the relationship between the parts of the acoustic apparatus (e.g., the acoustic apparatus 200) and the relationship between the acoustic apparatus and the user, one or more coordinate systems may be established in the present disclosure. In some embodiments, the one or more coordinate systems may be defined similar to that three basic planes of a sagittal plane, a coronal plane, and a horizontal plane, and three basic axes of a sagittal axis, a coronal axis, and a vertical axis of a human body are defined in the medical field. Referring to the coordinate axes in FIGS. 1 and 2, the sagittal plane may refer to a tangent plane perpendicular to the ground along a front-back direction of the human body, which may divide the human body into left and right portions. In some embodiments of the present disclosure, the sagittal plane may refer to a YZ plane. That is, an X-axis may be perpendicular to the sagittal plane of the user. The coronal plane may refer to a tangent plane perpendicular to the ground along a left-right direction of the human body, which may divide the human body into front and rear portions. In some embodiments of the present disclosure, the coronal plane may refer to an XZ plane. That is, a Y-axis may be perpendicular to the coronal plane of the user. The horizontal plane may refer to a tangent plane parallel to the ground along an upper-lower direction of the human body, which may divide the human body into upper and lower portions. In some embodiments of the present disclosure, the horizontal plane may refer to an XY plane. That is, a Z-axis may be perpendicular to the horizontal plane of the user. Correspondingly, the sagittal axis may refer to an axis that vertically passes through the coronal plane along the front-back direction of the human body. In some embodiments of the present disclosure, the sagittal axis may refer to the Y-axis. The coronal axis may refer to an axis that vertically passes through the sagittal plane along the left-right direction of the human body. In some embodiments of the present disclosure, the coronal axis may refer to the X-axis. The vertical axis may refer to an axis that vertically passes through the horizontal plane along the upper-lower direction of the human body. In some embodiments of the present disclosure, the vertical axis may refer to the Z-axis.

It should be noted that a wearing state of the acoustic apparatus 200 shown in FIG. 2 is a normal wearing state. Due to individual differences among users, an actual wearing state of the acoustic apparatus 200 may have certain differences compared with the aforementioned normal wearing state. In some embodiments, the structure, shape, size, thickness, etc., of one or more parts of the ear 100 may be different for different types of users (e.g., adult men, adult women, minors, children, etc.). For example, a portion of the structure of the acoustic apparatus may shield part or all of the external ear canal 101. These changes and modifications are still within the protection scope of the present disclosure.

Figure 3:
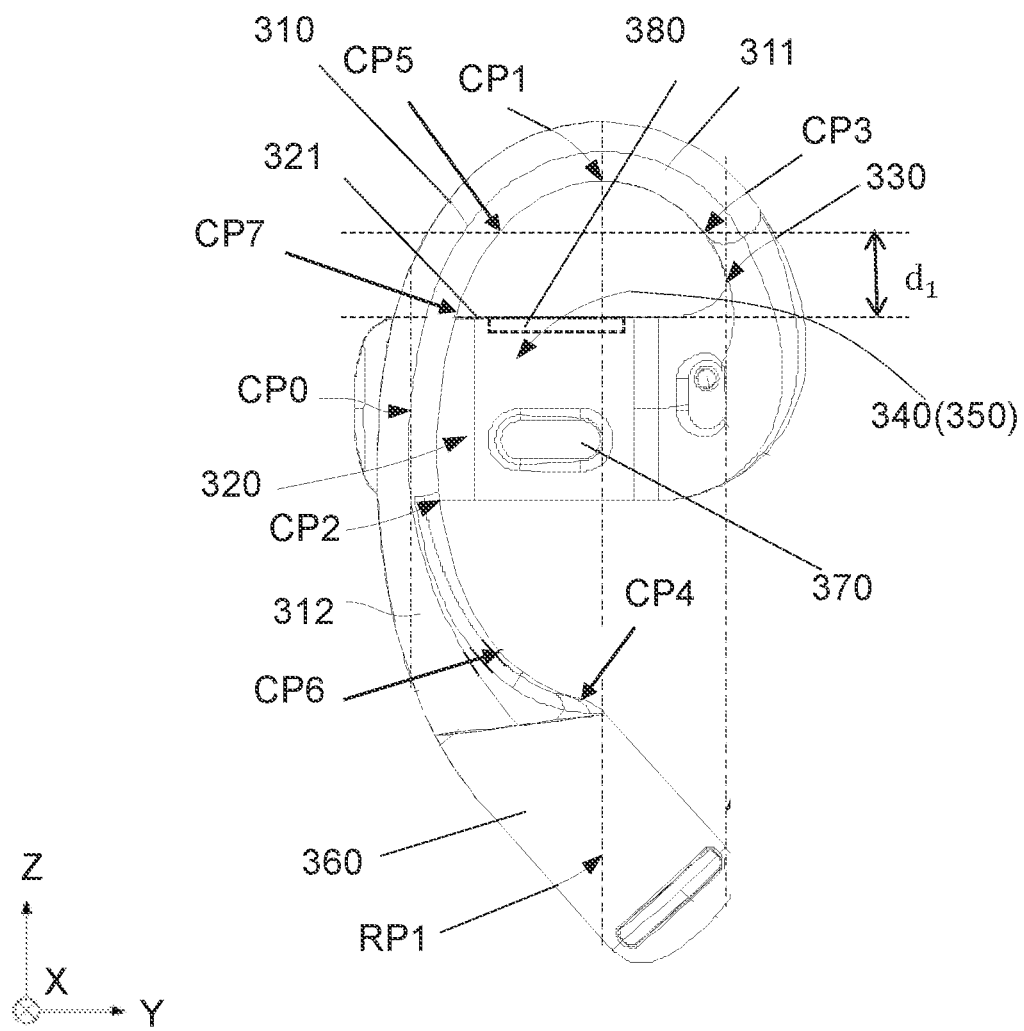
FIG. 3 is a schematic diagram illustrating a structure of an exemplary acoustic apparatus viewed from a back side of an ear to a front side of the ear according to some embodiments of the present disclosure.
Figure 4:
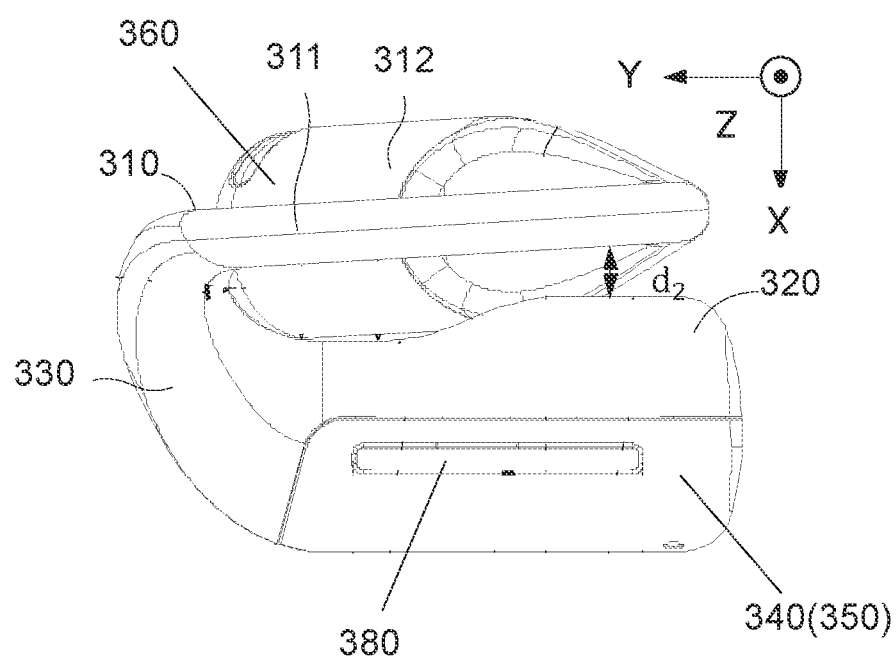
FIG. 4 is a schematic diagram illustrating a structure of an exemplary acoustic apparatus viewed from a top side of a head of a user according to some embodiments of the present disclosure.
Figure 5:
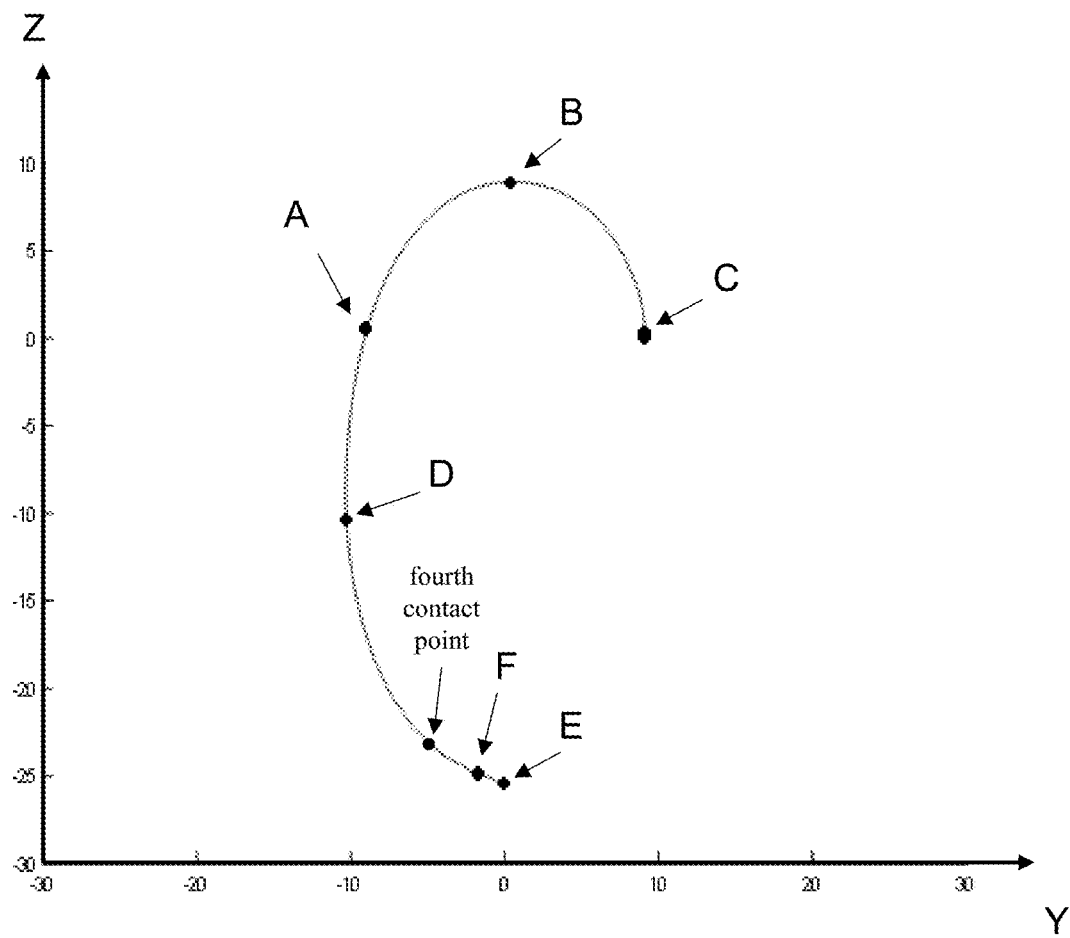
FIG. 5 is a schematic diagram illustrating a projection curve of an exemplary acoustic apparatus on a YZ plane according to some embodiments of the present disclosure.

FIG. 3 is a schematic diagram illustrating a structure of an exemplary acoustic apparatus viewed from a back side of an ear to a front side of the ear according to some embodiments of the present disclosure. FIG. 4 is a schematic diagram illustrating a structure of an exemplary acoustic apparatus viewed from a top side of a head of a user according to some embodiments of the present disclosure. FIG. 5 is a schematic diagram illustrating a projection curve of an exemplary acoustic apparatus on a YZ plane according to some embodiments of the present disclosure.

Referring to FIGS. 3 and 4, in some embodiments, the acoustic apparatus 300 may include a hook-shaped part 310, a holding part 320, and a connecting part 330. When the user is wearing the acoustic apparatus 300, the hook-shaped part 310 may be hung between a first side of the ear and the head of the user, the holding part 320 may be in contact with a second side of the ear, and the connecting part 330 may be connected with the hook-shaped part 310 and the holding part 320. The first side of the ear may be a back side of the ear of the user. The second side of the ear may be a front side of the ear of the user. The front side of the ear of the user may refer to a side where the ear of the user includes the cymba of auricular concha (e.g., the cymba of auricular concha 103), the triangular fossa (e.g., the triangular fossa 104), the antihelix (e.g., the antihelix 105), the scaphoid (e.g., the scapha 106), the helix (e.g., the helix 107), etc. The back side of the ear of the user may refer to a side of the ear of the user that is away from the front side. That is, the back side may be a side opposite to the front side.

In some embodiments, the hook-shaped part 310 may at least partially contact the first side of the ear when the user is wearing the acoustic apparatus 300. In some embodiments, the hook-shaped part 310 may include any shape suitable for the user to wear the acoustic apparatus 200, for example, a hook shape, a C shape, or the like. In some embodiments, the hook-shaped part 310 may have a certain elastic deformation ability, so that the hook-shaped part 310 may be deformed under the action of an external force, thereby generating a displacement relative to the holding part 320 to allow the hook-shaped part 310 to cooperate with the holding part 320 to elastically clamp the ear. In this way, during a process that the user wears the acoustic apparatus 300, the user may first apply a little force to make the hook-shaped part 310 deviate from the holding part 320, so that the ear may extend between the holding part 320 and the hook-shaped part 310. After a wearing position is suitable, the user may let go to allow the acoustic apparatus 300 to clamp the ear elastically. In some embodiments, the wearing position of the acoustic apparatus 300 on the ear may be further adjusted according to the actual wearing situations.

In some embodiments, during the process that the user wears the acoustic apparatus 300, the hook-shaped part 310 may deviate from the holding part 320 in a direction perpendicular to the sagittal plane of the user (e.g., an X-axis direction shown in FIG. 3), so that the hook-shaped part 310 may generate a first pressing force on the first side of the ear. In some embodiments, a main action direction of the first pressing force may be a direction perpendicular to the sagittal plane of the user. In some embodiments, during the process that the user wears the acoustic apparatus 300, the hook-shaped part 310 may also deflect relative to the holding part 320 using a highest point (e.g., a position of a point CP1) of the hook-shaped part 310 corresponding to the ear of the user as a fulcrum in a plane (e.g., a ZOY plane shown in FIG. 3) parallel to the sagittal plane of the user, so that the hook-shaped part 310 may generate a second pressing force on the first side of the ear. In some embodiments, the second pressing force may act on the ear of the user through one or more contact regions (e.g., other contact regions except the position of the point CP1) on the hook-shaped part 310. In some embodiments, an action position of the second pressing force may be a position of a midpoint CP0 of a portion where a projection of the hook-shaped part 310 in the X-axis direction (i.e., the direction perpendicular to the sagittal plane of the user) overlaps with a projection of the holding part 320 in the X-axis direction. In some embodiments, an action position of the second pressing force may be a position corresponding to an arc segment of the hook-shaped part 310 near the position of the point CP0. The arc segment may correspond to one of the one or more contact regions of the hook-shaped part 310. In some embodiments, the action position of the second pressing force may be an arc segment (e.g., an arc segment from a point CP2 to a point CP7 shown in FIG. 3) corresponding to a portion where the projection of the hook-shaped part 310 in the X-axis direction (i.e., the direction perpendicular to the sagittal plane of the user) overlaps with the projection of the holding part 320 in the X-axis direction. In some embodiments, the action direction of the second pressing force may be a direction (e.g., a Y-axis direction) perpendicular to the coronal plane of the user. In some embodiments, the first pressing force and the second pressing force may be measured when the user is wearing the acoustic apparatus 300. In some embodiments, the first pressing force and the second pressing force may also be measured by simulating a force situation when the user is wearing the acoustic apparatus 300. For example, after a deviation distance that the hook-shaped part 310 deviates from the holding part 320 in the direction perpendicular to the sagittal plane of the user is measured when the user is wearing the acoustic apparatus 300, the first pressing force may be measured by making the same deviation distance on the hook-shaped part 310 relative to the holding part 320. As another example, after a deviation distance that the hook-shaped part 310 deviates from the holding part 320 in the direction perpendicular to the coronal plane of the user is measured when the user is wearing the acoustic apparatus 300, the second pressing force may be measured by making the same deviation distance on the hook-shaped part 310 relative to the holding part 320.

In some embodiments, in order to take into account the firmness and comfort of the user wearing the acoustic apparatus 300, the first pressing force and the second pressing force of the hook-shaped part 310 on the first side of the ear may be set within an appropriate range. In some embodiments, by adjusting a distance between the action position (e.g., the position of the point CP1) of the first pressing force on the hook-shaped part 310 and the holding part 320 along the direction perpendicular to the sagittal plane of the user (e.g., the X-axis direction), the first pressing force may be set within the appropriate range. In some embodiments, by adjusting a size of the action position (e.g., the position of the point CP0) of the second pressing force on the hook-shaped part 310 and the connecting part 330 (e.g., a position of a point CP3) along the direction perpendicular to the coronal plane of the user (e.g., the Y-axis direction), the second pressing force may be set within the appropriate range.

In some embodiments, the first pressing force of the hook-shaped part 310 on the first side of the ear may be within a range from 0.05 Newton (N) to 3 N. In some embodiments, the first pressing force of the hook-shaped part 310 on the first side of the ear may be within a range from 0.08 N to 2 N. In some embodiments, the first pressing force of the hook-shaped part 310 on the first side of the ear may be within a range from 0.1 N to 1 N. In some embodiments, the first pressing force of the hook-shaped part 310 on the first side of the ear may be within a range from 0.15 N to 0.8 N. In some embodiments, the first pressing force of the hook-shaped part 310 on the first side of the ear may be within a range from 0.2 N to 0.6 N. In some embodiments, the first pressing force of the hook-shaped part 310 on the first side of the ear may be within a range from 0.3 N to 0.4 N.

In some embodiments, the second pressing force of the hook-shaped part 310 on the first side of the ear may be within a range from 0.05 N to 3 N. In some embodiments, the second pressing force of the hook-shaped part 310 on the first side of the ear may be within a range from 0.1 N to 2 N. In some embodiments, the second pressing force of the hook-shaped part 310 on the first side of the ear may be within a range from 0.1 N to 1 N. In some embodiments, the second pressing force of the hook-shaped part 310 on the first side of the ear may be within a range from 0.2 N to 0.8 N. In some embodiments, the second pressing force of the hook-shaped part 310 on the first side of the ear may be within a range from 0.3 N to 0.7 N. In some embodiments, the second pressing force of the hook-shaped part 310 on the first side of the ear may be within a range from 0.4 N to 0.6 N.

In some embodiments, the hook-shaped part 310 may include a first portion 311 and a second portion 312. In some embodiments, a starting point (the point CP3) of the first portion 311 may be a connection point between the first portion 311 and the connecting part 330, and an ending point (the point CP2) of the first portion 311 may be a projected position of a bottom edge of the holding part 320 away from the connecting part 330 along the X-axis direction on the hook-shaped part 310. A starting point (the point CP2) of the second portion 312 may be the ending point of the first portion 311, and an ending point (a point CP4) of the second portion 312 may be an endpoint of a free end (an end away from the connecting part 330) of the hook-shaped part 310.

In some embodiments, the pressing force (e.g., the first pressing force and the second pressing force) of the hook-shaped part 310 on the first side of the ear may be applied to the ear of the user by the first portion 311 and the second portion 312, respectively. In some embodiments, a projection of the first portion 311 and the projection of the holding part 320 on the sagittal plane of the user may have an overlapping portion (e.g., corresponding to the arc segment from the point CP2 to the point CP7 as shown in FIG. 3). When the user is wearing the acoustic apparatus 300, the distance between the hook-shaped part 310 and the holding part 320 corresponding to the overlapping portion may vary the most. Therefore, when the user is wearing the acoustic apparatus 300, the overlapping portion may generate a greater pressing force on the ear of the user than other portions. Through such setting, the pressing force provided by the holding part 320 for the first portion 311 may be greater than the pressing force provided by the holding part 320 for the second portion 312.

In some embodiments, when the user is wearing the acoustic apparatus 300, the hook-shaped part 310 may also generate a friction force on the ear to overcome a motion tendency of the acoustic apparatus 300 to rotate relative to the ear due to a wearing operation. In some embodiments, different portions of the hook-shaped part 310 may provide different friction forces on the ear. In some embodiments, the first portion 311 and the second portion 312 may provide different friction forces on the ear. In some embodiments, a surface of the second portion 312 may be rougher than a surface of the first portion 311. In some embodiments, a surface friction coefficient of the second portion 312 may be 1.1-4 times a surface friction coefficient of the first portion 311. In some embodiments, the surface friction coefficient of the second portion 312 may be 1.5-4 times the surface friction coefficient of the first portion 311. In some embodiments, the surface friction coefficient of the second portion 312 may be 2-4 times the surface friction coefficient of the first portion 311. Since the hook-shaped part 310 (e.g., the first portion 311 and the second portion 312) has an arc-shaped contact surface with the ear of the user, the larger the contact area between the hook-shaped part 310 and the ear is, the greater the sum of the friction forces between the hook-shaped part 310 and the ear may be. In some embodiments, the contact area between the second portion 312 and the ear may be larger than the contact area between the first portion 311 and the ear, so that the friction force of the second portion 312 on the ear may be greater than the friction force of the first portion 311 on the ear. In some embodiments, the contact area between the second portion 312 and the ear may be 1.1-4 times the contact area between the first portion 311 and the ear. In some embodiments, the contact area between the second portion 312 and the ear may be 1.2-3 times the contact area between the first portion 311 and the ear. In some embodiments, the contact area between the second portion 312 and the ear may be 1.5-3 times the contact area between the first portion 311 and the ear.

In order to illustrate the first portion 311 and the second portion 312 more clearly, referring to FIG. 5, the first portion 311 and the second portion 312 may be described using a projection curve of the hook-shaped part 310 on the sagittal plane of the user (i.e., the projection curve of the hook-shaped part 310 on the YZ plane).

Referring to FIG. 5, in some embodiments, the projection of the first portion 311 of the hook-shaped part 310 on the sagittal plane of the user may include a first curve (i.e., a curve CBAD shown in FIG. 5). In some embodiments, the first curve may be a curve corresponding to an axis of the first portion 311. A position of the acoustic apparatus 300 corresponding to a starting point C of the first curve CBAD may be a connection point (e.g., the point CP3 shown in FIG. 3) between the first portion 311 of the hook-shaped part 310 and the connecting part 330. A position of the acoustic apparatus 300 corresponding to an ending point D of the first curve CBAD may be the ending point (e.g., the point CP2 shown in FIG. 3) of the first portion 311.

In some embodiments, in a coordinate system YOZ, the first curve CBAD may be described according to Equation (1):

$$f(y)=P_1 \times y^6+P_2 \times y^5+P_3 \times y^4+P_4 \times y^3+P_5 \times y^2+P_6 \times y+P_7, \quad (1)$$

where, $P_1=-1.393 \times 10^{-5}$, $P_2=-3.423 \times 10^{-6}$, $P_3=9.998 \times 10^{-4}$, $P_4=4.292 \times 10^{-5}$, $P_5=-9.172 \times 10^{-2}$, $P_6=8.412 \times 10^{-2}$, and $P_7=9.038$.

In some embodiments, based on a functional relationship between Z (i.e., f(y)) and y, a first-order derivation may be performed on the Equation (1). A point where the first-order derivative of the curve f(y) is zero may be obtained, which may also be referred to as an extremum point of the curve f(y). In some embodiments, the extremum point of the fitting curve f(y) corresponding to the first curve CBAD may include a first extremum point. That is, the first curve CBAD may include the first extremum point. In some embodiments, the first extremum point of the curve f(y) may be point B. That is, the first curve CBAD may include a first extremum point B in the first direction. Since the first extremum point B is determined based on the curve Z=f(y) of the Equation (1), the first extremum point B may be considered as the extremum point of the curve in a direction of the coordinate axis Z (also referred to as a Z-axis direction), and the Z-axis direction may be recorded as the first direction. That is, the first curve CBAD may include the first extremum point B in the first direction. In some embodiments, the first direction may be a direction perpendicular to an extending direction of the holding part 320. The extending direction of the holding part 320 may refer to a direction where the free end of the holding part 320 points. In some embodiments, the first direction may also be a direction perpendicular to the horizontal plane of the user when the user is wearing the acoustic apparatus 300. In some embodiments, referring to FIG. 5, the first direction may be a direction where the Z-axis is located. In some embodiments, the first extremum point B may be a maximum point of the curve Z=f(y) of the Equation (1) in the Z-axis direction. In some embodiments, a position of the hook-shaped part 310 hung on the ear of the user corresponding to the first extreme point B may be the highest point (e.g., the point CP1 shown in FIG. 3) of the hook-shaped part 310 in the first direction. In some embodiments, the fitting curve f(y) corresponding to the first curve CBAD may include only one extremum point B in the first direction. Through such setting, it may be more convenient to set the extremum point B and curvature changes of the curve CBAD near the extremum point B, which can improve the precision of the curve design of the hook-shaped part 310.

In some embodiments, when the user is wearing the acoustic apparatus 300, the extremum point B (i.e., the highest point CP1 of the acoustic apparatus 300 in the first direction) of the first curve CBAD may be in contact with a region (e.g., from the highest point of the helix to the connection position above the ear and the head) near the highest point of the ear along the Z-axis direction. At the contact position, the ear may also provide a supporting force for the acoustic apparatus 300 to balance the gravity of the acoustic apparatus 300, thereby providing the wearing stability of the acoustic apparatus 300.

It should be noted that the fitting function of the Equation (1) and corresponding coefficient $P_1$-$P_7$ thereof may be only a fitting expression to realize a curve design when the first portion 311 includes the first extremum point near the highest point CP1, and it may not constitute a restriction on the curve CBAD corresponding to the first portion 311. Those skilled in the art may change the order of the variable of the fitting expression, the coefficients of each order variable, or the type of the fitting function according to the actual situation, so that the corresponding curve of the first portion 311 includes the maximum point near CP1, and these fitting results should be included within the scope of the embodiments of the present disclosure.

In some embodiments, an outer diameter of a horizontal plane of the second portion 312 may be greater than an outer diameter of a horizontal plane of the first portion 311, so that the first portion 311 and the second portion 312 may form a necked (or necked-like) structure. Therefore, the contact area between the second portion 312 and the first side of the ear may be increased, thereby increasing the friction force between the second portion 312 and the first side of the ear, and improving the wearing stability of the acoustic apparatus 300. In some embodiments, referring to FIG. 5, a projection of the second portion 312 on the sagittal plane of the user may include a second curve (i.e., a curve DFE shown in FIG. 5). In some embodiments, the second curve may be a curve corresponding to an axis of the second portion 312. The position of the acoustic apparatus 300 corresponding to the starting point D of the second curve DFE may be the starting point (e.g., the point CP2 shown in FIG. 3) of the second portion 312 of the hook-shaped part 310. In some embodiments, the starting point of the second curve DFE may be a connection point between the first curve CBAD and the second curve DFE. In some embodiments, the connection point between the first curve CBAD and the second curve DFE may be an intersection point of the bottom edge of the holding part 320 away from the connecting part 330 along the direction perpendicular to the horizontal plane of the user and a projection of the hook-shaped part 310 on the sagittal plane of the user. A position of the acoustic apparatus 300 corresponding to an ending point E of the second curve DFE may be the end point (e.g., the point CP4 as shown in FIG. 3) of the free end (the end away from the connecting part 330) of the hook-shaped part 310. In some embodiments, a projection of the end point (i.e., the ending point E) of the second curve DFE and the first extremum point (the extremum point B) of the first curve CBAD along the first direction (the Z-axis direction) may be substantially coincident. Being substantially coincident may refer to that two points coincide or a distance between the two points is less than 0.5 millimeters (mm). That is, both the end point E of the second curve DFE and the first extremum point B of the first curve CBAD may be on a first reference plane RP1 in FIG. 3. The first reference plane RP1 may refer to a reference plane that passes through the first extremum point B of the first curve CBAD and is parallel to the XZ plane. Through such setting, a symmetry of the hook-shaped part 310 about the XY plane may be improved, a balance of the overall structure may be improved, the matching degree between the acoustic apparatus 300 and the ear may be improved, and the wearing comfort and wearing stability of the acoustic apparatus 300 may be improved.

In some embodiments, the second curve DFE may be described according to Equation (2):

$$f(y)=Q_1 \times y^4 + Q_2 \times y^3 + Q_3 \times y^2 + Q_4 \times y + Q_5, \quad (2)$$

where, $Q_1=3.931\times10^{-3}$, $Q_2=5.546\times10^{-2}$, $Q_3=2.974\times10^{-1}$, $Q_4=9.822\times10^{-2}$, and $Q_5=-25.41$.

In some embodiments, based on a functional relationship between Z (i.e., f(y)) and y, a first-order derivation may be performed on the Equation (2). A point where the first-order derivative of the curve f(y) is zero may be obtained, which may also be referred to as an extremum point of the curve f(y). In some embodiments, the extremum point of the fitting curve f(y) corresponding to the second curve DFE may include a second extremum point. That is, the second curve DFE may include a second extremum point. In some embodiments, the second extremum point of the curve f(y) may be a point F. That is, the second curve DFE may include a second extremum point F in the first direction. Since the second extremum point F is determined based on the curve Z=f(y) of the Equation (2), the second extremum point F may be considered as the extremum point of the curve in the direction of the coordinate axis Z (also referred to as the Z-axis direction), and the Z-axis direction may be recorded as the first direction. That is, the second curve DFE may include the second extremum point F in the first direction. In some embodiments, the second extremum point F may be a minimum point of the curve Z=f(y) of the Equation (2) in the Z-axis direction. In some embodiments, the second extremum point F of the second curve DFE may be close to the ending point E of the second curve DFE. In some embodiments, a distance between the second extremum point F and the ending point E of the second curve DFE along the Y-axis direction may be within a range from 0.01 mm to 5 mm. In some embodiments, the distance between the second extremum point F and the ending point E of the second curve DFE along the Y-axis direction may be within a range from 0.02 mm to 4 mm. In some embodiments, the distance between the second extremum point F and the ending point E of the second curve DFE along the Y-axis direction may be within a range from 0.03 mm to 3 mm. In some embodiments, the distance between the second extremum point F and the ending point E of the second curve DFE along the Y-axis direction may be within a range from 0.04 mm to 2 mm. In some embodiments, a position of the second extremum point F on the second portion 312 may be a concave position near the auricular lobule 108 when the acoustic apparatus 300 is hung on the ear of the user. By disposing the second extremum point at the position F near the free end E of the second portion 312, the second portion 312 may form a hook-shaped structure on a segment FE. When the user is wearing the acoustic apparatus 300, the hook-shaped structure formed by the segment FE may hook the concave portion of the auricular lobule, thereby increasing the stability when the user is wearing the acoustic apparatus 300. In some embodiments, the fitting curve f(y) corresponding to the second curve DFE may include only one extremum point F in the first direction. Through such setting, it may be more convenient to set the extremum point F and curvature changes of the curve DFE near the extremum point F, which can improve the precision of the curve design of the hook-shaped part 310.

It should be noted that the fitting function of the Equation (2) and corresponding coefficient $Q_1$-$Q_5$ thereof may be only a fitting expression to realize a curve design when the second portion 312 includes a minimum point near the free end, and it may not constitute a restriction on the curve DFE corresponding to the second portion 312. Those skilled in the art may change the order of the variable of the fitting expression, the coefficients of each order variable, or the type of the fitting function according to the actual situation, so that the corresponding curve of the second portion 312 includes the minimum point near the free end, and these fitting results should be included within the scope of the embodiments of the present disclosure.

In some embodiments, the first portion 311 and the second portion 312 of the hook-shaped part 310 may be connected through the connection point CP2 to form the hook-shaped part 310. Therefore, the first curve CBAD and the second curve DFE may also be connected through the connection point D to form a projection curve CDE of the hook-shaped part 310 on the sagittal plane (e.g., a plane parallel to the YZ plane) of the user. In some embodiments, in order to increase the contact area between the hook-shaped and the ear at the connection point CP2, a curvature of the curve CDE at the connection point D may be set to be as small as possible, so that the hook-shaped part 310 may have a gentler curve change around the position of the point CP2. Therefore, when the user is wearing the acoustic apparatus 300, the second pressing force on the ear near the position may be dispersed, and the wearing comfort of the user may be improved. In some embodiments, the curvature at the position of the connection point D may be less than 0.1. In some embodiments, the curvature at the position of the connection point D may be less than 0.08. In some embodiments, the curvature at the position of the connection point D may be less than 0.06. In some embodiments, the curvature at the position of the connection point D may be less than 0.04.

In some embodiments, since a projection curve of an ear contour of the user on the sagittal plane of the user is an irregular curve with a concave-convex change other than a smooth curve, in order to increase the contact area between the hook-shaped part 310 and the ear, the curve (e.g., the first curve CBAD and/or the second curve DFE) corresponding to the hook-shaped part 310 may also have a corresponding concave-convex change. In some embodiments, corresponding inflection points may be designed for the first curve CBAD and/or the second curve DFE, so that the hook-shaped part 310 may also have the corresponding concave-convex change. For example, a cartilage near the highest point of the ear along the Z-axis direction may include a slight depression. The depression may change the concave-convexity of the projection curve of the ear contour on the sagittal plane of the user near the position. That is, the projected curve of the ear on the sagittal plane of the user may have an inflection point at a place corresponding to the depression. By designing the curve of the hook-shaped part 310, the curve CBAD of the first portion 311 of the hook-shaped part 310 may also have an inflection point at a place corresponding to the depression. Therefore, when the user is wearing the acoustic apparatus 300, the hook-shaped part 310 may have a larger contact area near the highest point of the ear along the Z-axis direction, thereby dispersing the force (e.g., the gravity, the first pressing force, etc.) of the acoustic apparatus 300 received by the ear, reducing the pressure of the acoustic apparatus 300 on a local contact region of the ear (the contact region near the highest point CP1 and the highest point of the ear), and improving the wearing comfort of the user. As another example, since there is a depression near the auricular lobule of the ear, the depression may change the concave-convexity of the ear contour near the auricular lobule. That is, there may be an inflection point on the contour line of the ear. By designing the curve of the hook-shaped part 310, the curve DFE of the second portion 312 of the hook-shaped part 310 may also have an inflection point at a place corresponding to the depression. Therefore, when the user is wearing the acoustic apparatus 300, the second portion 312 of the hook-shaped part 310 may be in contact with the ear (especially near the auricular lobule) of the user as much as possible, thereby increasing the friction force between the second portion 312 and the first side of the ear.

In some embodiments, referring to FIGS. 3-4, the connecting part 330 may be connected with the hook-shaped part 310 and the holding part 320, and extend from the first side to the second side of the ear of the user. The connecting part 330 may be connected with the hook-shaped part 310 and the holding part 320, so that the holding part 320 may provide a pressing force on the first side of the ear for the hook-shaped part 310, and the hook-shaped part 310 may provide a pressing force on the second side of the ear 100 for the holding part 320.

In some embodiments, the connecting part 330 may be used to connect the hook-shaped part 310 and the holding part 320. For example, a first end of the connecting part 330 may be connected with the hook-shaped part 310, and a second end of the connecting part 330 may be connected with the holding part 320. In some embodiments, a connection between the hook-shaped part 310 and the connecting part 330 may include a fixed connection or a movable connection, and a connection between the connecting part 330 and the holding part 320 may include a fixed connection or a movable connection. In some embodiments, a relative positional relationship between the hook-shaped part 310 and the connecting part 330, and a relative positional relationship between the connecting part 330 and the holding part 320 in the three-dimensional space may be adjusted, so that the acoustic apparatus 300 may adapt to different users, thereby increasing the applicable range of the acoustic apparatus 300. For example, the connecting part 330 may be made of deformable materials such as soft steel wire, and the user may adjust relative positions of the hook-shaped part 310, the connecting part 330, and/or the holding part 320 in the three-dimensional space by bending the connecting part 330 to rotate one part relative to the other part to meet wearing requirement(s) of the user. In some embodiments, parameters (e.g., a shape, length, thickness, etc.) of the connecting part 330 may be set according to specific conditions to adapt to ears with different thicknesses and shapes.

In some embodiments, a part where the connecting part 330 (and/or the hook-shaped part 310, the holding part 320) is in contact with the ear of the user may be made of a softer material, a harder material, or the like, or a combination thereof. A softer material refers to a material having a hardness (e.g., shore hardness) less than a first hardness threshold (e.g., 15A, 20A, 30A, 35A, 40A, etc.). For example, a softer material may have a shore hardness of 45-85A, 30-60D. A harder material refers to a material with a hardness (e.g., shore hardness) greater than a second hardness threshold (e.g., 65D, 70D, 80D, 85D, 90D, etc.). A softer material may include a polyurethanes (PU) (e.g., thermoplastic polyurethanes (TPU)), polycarbonate (PC), a polyamides (PA), an acrylonitrile-butyl acrylonitrile butadiene styrene (ABS), a polystyrene (PS), a high impact polystyrene (HIPS), a polypropylene (PP), a polyethylene terephthalate (PET), a polyvinyl chloride (PVC), a polyurethanes (PU), a polyethylene (PE), a phenol formaldehyde (PF), an urea-formaldehyde (UF), a melamine-formaldehyde (MF), a silica gel, or the like, or any combination thereof. A harder material may include a poly ester sulfones (PES), a polyvinylidene chloride (PVDC), a polymethyl methacrylate (PMMA), a poly-ether-ether-ketone (PEEK), or the like, or any combination thereof, or a mixture thereof with a reinforcing agent such as glass fiber, carbon fiber, etc. In some embodiments, the material of the part where the connecting part 330 (and/or the hook-shaped part 310, the holding part 320) of the acoustic apparatus 300 is in contact with the ear of the user may be selected according to specific conditions. In the embodiment, the softer material may improve the comfort of the user when the user is wearing the acoustic apparatus 300 and the matching degree between the acoustic apparatus 300 and the ear of the user, and the harder material may improve the strength of the acoustic apparatus 300. By reasonably configuring the materials of the parts of the acoustic apparatus 300, the strength of the acoustic apparatus 300 may be improved while improving the comfort of the user.

In some embodiments, the interior of the connecting part 330 (and/or the hook-shaped part 310, the holding part 320) of the acoustic apparatus 300 may be disposed with an elastic filamentary structure to improve the structural strength of the acoustic apparatus 300. Both the above softer material and harder material may be coated on the elastic filamentary structure. In some embodiments, the elastic filamentary structure may include a wire (e.g., spring steel, titanium alloy, titanium nickel alloy, chromium molybdenum steel, aluminum alloy, copper alloy, etc.), a fiber filament (e.g., glass fiber, carbon fiber, etc.), or the like, or any combination thereof. In some embodiments, the elastic filamentary structure (e.g., the wire) disposed inside the connecting part 330 (and/or the hook-shaped part 310, the holding part 320) may be used to strengthen the strength of the connecting part 330 (and/or the hook-shaped part 310, the holding part 320). In some embodiments, parameters such as the count, shape, length, thickness, diameter, etc., of the wire may be set according to actual needs (e.g., a diameter of a part of the acoustic apparatus, a strength requirement for a part of the acoustic apparatus, etc.). The shape of the wire may include any suitable shape, such as, a cylinder, a cube, a cuboid, a prism, an ellipsoid, etc.

In some embodiments, in order to improve the matching degree between ears of different types of users and the acoustic apparatus 300, and further improve the comfort and stability when the acoustic apparatus 300 is worn, a size of the connecting part 330 may be reasonably set. In some embodiments, the size of the connecting part 330 may include a height size of the connecting part 330 along the direction (the Z-axis direction) perpendicular to the horizontal plane of the user and a depth size of the connecting part 330 along the direction (the X-axis direction) perpendicular to the sagittal plane of the user. In some embodiments, the height size of the connecting part 330 along the Z-axis direction may be a distance size along the Z-axis direction between the connection point of the connecting part 330 connected with the hook-shaped part 310 and the connection point of the connecting part 330 connected with the holding part 320. In some embodiments, the depth size of the connecting part 330 along the X-axis direction may be a distance size along the X-axis direction between the connection point of the connecting part 330 connected with the hook-shaped part 310 and the connection point of the connecting part 330 connected with the holding part 320. In some embodiments, referring to FIG. 3, a size $d_1$ of the connecting part 330 along the direction (the Z-axis direction) perpendicular to the horizontal plane of the user may be within a range from 0.36 mm to 4.76 mm. In some embodiments, referring to FIG. 3, the size $d_1$ of the connecting part 330 along the direction (the Z-axis direction) perpendicular to the horizontal plane of the user may be within a range from 0.56 mm to 4.56 mm. In some embodiments, referring to FIG. 3, the size $d_1$ of the connecting part 330 along the direction (Z-axis direction) perpendicular to the horizontal plane of the user may be within a range from 1.06 mm to 4.06 mm. In some embodiments, referring to FIG. 3, the size $d_1$ of the connecting part 330 along the direction (Z-axis direction) perpendicular to the horizontal plane of the user may be within a range from 1.56 mm to 3.56 mm. In some embodiments, referring to FIG. 3, the size $d_1$ of the connecting part 330 along the direction (Z-axis direction) perpendicular to the horizontal plane of the user may be within a range from 2.06 mm to 3.06 mm. In some embodiments, referring to FIG. 3, the size $d_1$ of the connecting part 330 along the direction (Z-axis direction) perpendicular to the horizontal plane of the user may be within a range from 2.36 mm to 2.76 mm.

In some embodiments, referring to FIG. 3, a size $d_2$ of the connecting part 330 along the direction (X-axis direction) perpendicular to the sagittal plane of the user may within a range from 2 mm to 5 mm. In some embodiments, referring to FIG. 3, the size $d_2$ of the connecting part 330 along the direction (X-axis direction) perpendicular to the sagittal plane of the user may within a range from 2.3 mm to 4.7 mm. In some embodiments, referring to FIG. 3, the size $d_2$ of the connecting part 330 along the direction (X-axis direction) perpendicular to the sagittal plane of the user may within a range from 2.5 mm to 4.5 mm. In some embodiments, referring to FIG. 3, the size $d_2$ of the connecting part 330 along the direction (X-axis direction) perpendicular to the sagittal plane of the user may within a range from 2.7 mm to 4.3 mm. In some embodiments, referring to FIG. 3, the size $d_2$ of the connecting part 330 along the direction (X-axis direction) perpendicular to the sagittal plane of the user may within a range from 3 mm to 4 mm. In some embodiments, referring to FIG. 3, the size $d_2$ of the connecting part 330 along the direction (X-axis direction) perpendicular to the sagittal plane of the user may within a range from 3.3 mm to 3.7 mm.

In some embodiments, referring to FIG. 3 and FIG. 5, the connection point CP3 between the connecting portion 330 and the hook-shaped part 310 may have a first projection point CP5 on the hook-shaped part 310 along a second direction (the Y-axis direction) on the YZ plane. The first projection point CP5 may correspond to a point A in the first curve CBAD in FIG. 5. In some embodiments, the connection point CP3 and the first projection point CP5 may be symmetrical relative to the first reference plane RP1. At this time, a distance between the connection point CP3 (i.e., the point C in FIG. 5) between the connecting part 330 and the hook-shaped part 310 and the first extremum point B of the first curve CBAD along the second direction may be equal to a distance between the first projection point CP5 (i.e., the point A in FIG. 5) and the first extremum point B of the first curve CBAD along the second direction. That is, a projection length of a curve CB in the Y-axis direction in FIG. 5 may be equal to a projection length of a curve BA in the Y-axis direction. Through such setting, when the user wears the acoustic apparatus 300, the highest point CP1 of the first portion 311 may be in contact with a top end of the ear (a region near the highest point of the ear, e.g., a region from the highest point of the helix to a connection position above the ear and the head). The connection point CP3 between the connecting part 330 and the hook-shaped part 310 and the first projection point CP5 of the connection point CP3 may be symmetrically distributed on both sides of the point CP1 along the second direction (the Y-axis direction), which can improve the symmetry of the hook-shaped part 310 (the first portion 311) relative to the first reference plane RP1 and the balance of the overall structure of the first portion 311, thereby improving the matching degree of the acoustic apparatus 300 and the ear, and improving the wearing comfort and wearing stability of the acoustic apparatus 300.

It should be noted that the projection length of the curve CB in the Y-axis direction and the projection length of the curve BA in the Y-axis direction may also be different. For example, the projection length of the curve CB in the Y-axis direction may be slightly larger or smaller (e.g., a length difference of the two projection lengths is between ±1 mm) than the projection length of the curve BA in the Y-axis direction. In some embodiments, the projection length of the curve CB in the Y-axis direction and the projection length of the curve BA in the Y-axis direction may also be set according to actual needs (e.g., ear shapes of different types of users), which may be not limited herein.

In some embodiments, in order to improve the applicability of the acoustic apparatus 300, the distance between the connection point CP3 (the point C in FIG. 5) between the connecting part 330 and the hook-shaped part 310 and the first extremum point B of the first curve CBAD along the second direction (the Y-axis direction) may be disposed within an appropriate range, so that the comfort and stability may be improved when the user is wearing the acoustic apparatus 300. In some embodiments, the distance between the connection point CP3 (the point C in FIG. 5) between the connecting part 330 and the hook-shaped part 310 and the first extremum point B along the second direction (the Y-axis direction) may be within a range from 7 mm to 12 mm. In some embodiments, the distance between the connection point CP3 (the point C in FIG. 5) between the connecting part 330 and the hook-shaped part 310 and the first extremum point B along the second direction (the Y-axis direction) may be within a range from 7.5 mm to 11.5 mm. In some embodiments, the distance between the connection point CP3 (the point C in FIG. 5) between the connecting part 330 and the hook-shaped part 310 and the first extremum point B along the second direction (the Y-axis direction) may be within a range from 8 mm to 11 mm. In some embodiments, the distance between the connection point CP3 (the point C in FIG. 5) between the connecting part 330 and the hook-shaped part 310 and the first extremum point B along the second direction (the Y-axis direction) may be within a range from 8.5 mm to 10.5 mm. In some embodiments, the distance between the connection point CP3 (the point C in FIG. 5) between the connecting part 330 and the hook-shaped part 310 and the first extremum point B along the second direction (the Y-axis direction) may be within a range from 9 mm to 10 mm.

In some embodiments, referring to FIGS. 3 and 4, the holding part 320 may at least partially contact the second side of the ear of the user. In some embodiments, the holding part 320 may provide a pressing force on the second side of the ear of the user under the action of the hook-shaped part 310. That is, the hook-shaped part 310 may provide the pressing force on the second side of the ear of the user for the holding part 320. Under the action of the pressing force, the holding part 320 may be pressed against a region where the cymba of auricular concha (e.g., the cymba of auricular concha 103), the triangular fossa (e.g., the triangular fossa 104), the antihelix (e.g., the antihelix 105), etc., are located. Therefore, when the user is wearing the acoustic apparatus 300, the acoustic apparatus 300 may not shield an external ear canal of the ear (e.g., the external ear canal 101).

In some embodiments, the holding part 320 may not only be pressed against the second side of the ear of the user under the action of the pressing force, but also may be further extended and held in the cymba of auricular concha and/or the triangular fossa of the ear. In some embodiments, an extending direction of the holding part 320 may be along the Y-axis direction. Through such setting, the holding part 320 may be shielded by the helix of the ear at least in the extending direction of the connecting part 330, so as to prevent the holding part 320 from turning outward when the acoustic apparatus 300 is in a wearing state, thereby improving the wearing stability of the acoustic apparatus 300.

In some embodiments, the acoustic apparatus 300 may further include a core assembly 340, a main board assembly 350, a battery assembly 360, or the like, or any combination thereof. Any two of the core assembly 340, the main board assembly 350, and the battery assembly 360 may communicate in various ways, e.g., a wired connection, a wireless connection, or the like, or any combination thereof. In some embodiments, the wired connection may include a metal cable, an optical cable, a hybrid metal and optical cable, etc. The examples described above are only for convenience of description, and the medium of the wired connection may also be other types, for example, other transmission carriers of electrical signals or optical signals. The wireless connection may include radio communication, free space optical communication, acoustic communication, and electromagnetic induction, or the like.

In some embodiments, the core assembly 340 may be used to process a signal (e.g., an electrical signal) containing audio information to convert the signal into corresponding mechanical vibrations for generating a sound signal. The audio information may include a video, an audio file with a specific data format, or data or a file that may be converted into sound through a specific approach. The signal containing audio information may include an electrical signal, an optical signal, a magnetic signal, a mechanical signal, or the like, or a combination thereof. The processing may include frequency division, filtering, denoising, amplification, smoothing, or the like, or any combination thereof. The conversion process may include the coexistence and conversion of many different types of energy. For example, an electrical signal may be directly converted into mechanical vibrations through the core assembly to produce sound. As another example, audio information may be contained in an optical signal, and a specific earphone core may convert the optical signal into a vibration signal. In some embodiments, the core assembly 340 may be disposed in the holding part 320. In some embodiments, the core assembly 340 may close to the front side (e.g., the side where the crus of helix 109, the cymba of auricular concha 103, the triangular fossa 104, the antihelix 105, the scapha 106, and the helix 107 are located) of the tragus (e.g., crus of helix 109) of the ear of the user under compressive force. In some embodiments, the core assembly 340 may close to the second side (e.g., the side where the crus of helix 109, the cymba of auricular concha 103, the triangular fossa 104, the antihelix 105, the scapha 106, and the helix 107 are located) of the ear of the user. For example, the core assembly 340 may be in contact with one or more parts (e.g., the cymba of auricular concha 103, the triangular fossa 104, the antihelix 105, the scapha 106, and the helix 107, etc.) of the upper part of the external acoustic meatus of the user.

The main board assembly 350 may be used to control the sounding of the core assembly 340. In some embodiments, the main board assembly 350 may control the sounding of the core assembly 340 based on an instruction input by the user. In some embodiments, the main board assembly 350 may generate the instruction to control the core assembly 340 based on information from one or more components of the acoustic apparatus 300. For example, the main board assembly 350 may receive a voice signal of a user, e.g., "play a song." By processing the voice signal, the main board assembly 350 may generate a control instruction related to the voice signal. For example, the core assembly 340 may be controlled to obtain the song information to be played from the storage module (or other apparatus), and generate an electrical signal for controlling the vibration of the core assembly 340, etc. In some embodiments, main board assembly 350 may control other components of acoustic apparatus 300. For example, the main board assembly 350 may generate a control instruction to control the battery assembly 360 to provide the acoustic apparatus 300 with power for generating sound.

In some embodiments, the main board assembly 350 may include a central processing unit (CPU), an application specific integrated circuit (ASIC), an application specific instruction set processor (ASIP), a graphics processing unit (GPU), a physical processing unit (PPU), a digital signal processor (DSP), a field programmable gate array (FPGA), a programmable logic apparatus (PLD), a controller, a microcontroller unit, a reduced instruction set computer (RISC), a microprocessor, or the like, or any combination thereof.

In some embodiments, the main board assembly 350 may be disposed on any portion of the acoustic apparatus 300. For example, the main board assembly 350 may be disposed on the holding part 320. In this case, the wiring distance between the main board assembly 350 and other components (e.g., the core assembly 340, the key switch, etc.) disposed on the holding part 320 may be shortened to reduce signal interference between the wirings and reduce the possibility of short circuit between the wirings.

The battery assembly 360 may be used to provide electrical power to other assemblies in the acoustic apparatus 300. In some embodiments, the battery assembly 360 may include a flexible circuit board, a battery, or the like. The flexible circuit board may be used to connect the battery and other assemblies in the acoustic apparatus (e.g., the core assembly 340). The battery may include an accumulator, a dry cell, a lithium cell, a denier cell, or a fuel cell, or a combination thereof. In some embodiments, the battery assembly 360 may also transmit its own state information to the main board assembly 350 and receive an instruction from the main board assembly 350 to perform a corresponding operation. The status information of the battery assembly 360 may include on/off status, remaining power, usage time of the remaining power, charging time, or the like, or any combination thereof.

In some embodiments, the battery assembly 360 may be positioned anywhere on the acoustic apparatus 300. In some embodiments, the positions of one or more components in the acoustic apparatus 300 may be set based on the weights of the various portions of the acoustic apparatus 300 to balance the weights of the various portions of the acoustic apparatus 300, and improve the wearing stability and comfort of the acoustic apparatus 300. For example, the core assembly 340, the main board assembly 350, key switches, etc., may be disposed on the holding part 320. The battery assembly 360 may be disposed on the second portion 312 of the hook-shaped part 310, so that a lever balance may be formed between the second portion 312 and the holding part 320, and the stability of the acoustic apparatus 300 in terms of wearing may be improved.

In some embodiments, when the lever balance is formed between the second portion 312 and the holding part 320, a fulcrum of the lever may be the highest point CP1 of the first portion 311 in the Z-axis direction. Since the distance between the center of gravity of the holding part 320 and the highest point CP1 is different from the distance between the center of gravity of the battery assembly 360 and the highest point CP1, the total weight of the holding part 320 and the weight of the battery assembly 360 may be different. In some embodiments, the ratio between the total weight of the holding part 320 and the weight of the part of the hook-shaped part 310 including the battery assembly 360 (also referred to as a battery part) may be within 4:1. In some embodiments, the ratio between the total weight of the holding part 320 and the weight of the battery part may be within 3:1. In some embodiments, the ratio between the total weight of the holding part 320 and the weight of the battery part may be within 2.5:1. In some embodiments, the ratio between the total weight of the holding part 320 and the weight of the battery part may be 2:1. In some embodiments, the ratio between the total weight of the holding part 320 and the weight of the battery part may be within 1.5:1, so that the weight of the acoustic apparatus 300 may be evenly distributed at both ends, and when the user is wearing the acoustic apparatus 300, the ear of the user may be used as a fulcrum to support the acoustic apparatus 300, so that the acoustic apparatus 300 does not slip off the ear of the user.

In some embodiments, the acoustic apparatus 300 may further include a sound outlet hole 370 and a pressure relief hole 380 disposed on the holding part 320. In some embodiments, the sound emitted by the core assembly 340 may be transmitted to the ear of the user ear through the sound outlet hole 370. In some embodiments, the holding part 320 may form a front chamber and a rear chamber of the acoustic apparatus 300 on opposite sides of the core assembly 340, respectively. The sound outlet hole 370 may communicate with the front chamber and output the sound to the ear. In some embodiments, the pressure relief hole 380 may communicate with the rear chamber, and the pressure relief hole 380 may be farther away from the ear canal than the sound outlet hole 370. In this way, the pressure relief hole 380 may allow air to enter and exit the rear chamber freely, so that the change of air pressure in the front chamber may not be blocked by the rear chamber as much as possible, thereby improving the sound quality of the sound output to the ear through the sound outlet hole 370. Moreover, since phases of sounds output to the outside of the acoustic apparatus 300 through the sound outlet hole 370 and the pressure relief hole 380 are opposite, the phases may be reversed and canceled in the far field away from the ear. That is, an "acoustic dipole" may be formed, which can effectively reduce the volume of the sound of the far field (e.g., the sound transmitted to the environment) without reducing the sound volume of the near field (e.g., near the acoustic meatus of the user) to reduce sound leakage.

In some embodiments, in the projection of the user on the sagittal plane, by adjusting a distance between a first edge 321 of the holding part 320 close to the first extremum point B of the first curve CBAD and the first extremum point B of the first curve CBAD, the matching degree between the acoustic apparatus 300 and the ear of the user may be adjusted, thereby improving the wearing comfort and wearing stability of the acoustic apparatus 300. In some embodiments, the distance between the first edge 321 of the holding part 320 and the first extremum point B may be within a range from 5 mm to 15 mm. In some embodiments, the distance between the first edge 321 of the holding part 320 and the first extremum point B may be within a range from 6 mm to 13 mm. In some embodiments, the distance between the first edge 321 of the holding part 320 and the first extremum point B may be within a range from 7 mm to 11 mm. In some embodiments, the distance between the first edge 321 of the holding part 320 and the first extremum point B may be within a range from 8 mm to 10 mm. In some embodiments, the distance between the first edge 321 of the holding part 320 and the first extremum point B may be within a range from 8.5 mm to 9.5 mm. In some embodiments, the distance between the first edge 321 of the holding part 320 and the first extremum point B may be within a range from 8 mm to 9 mm.

Figure 6:
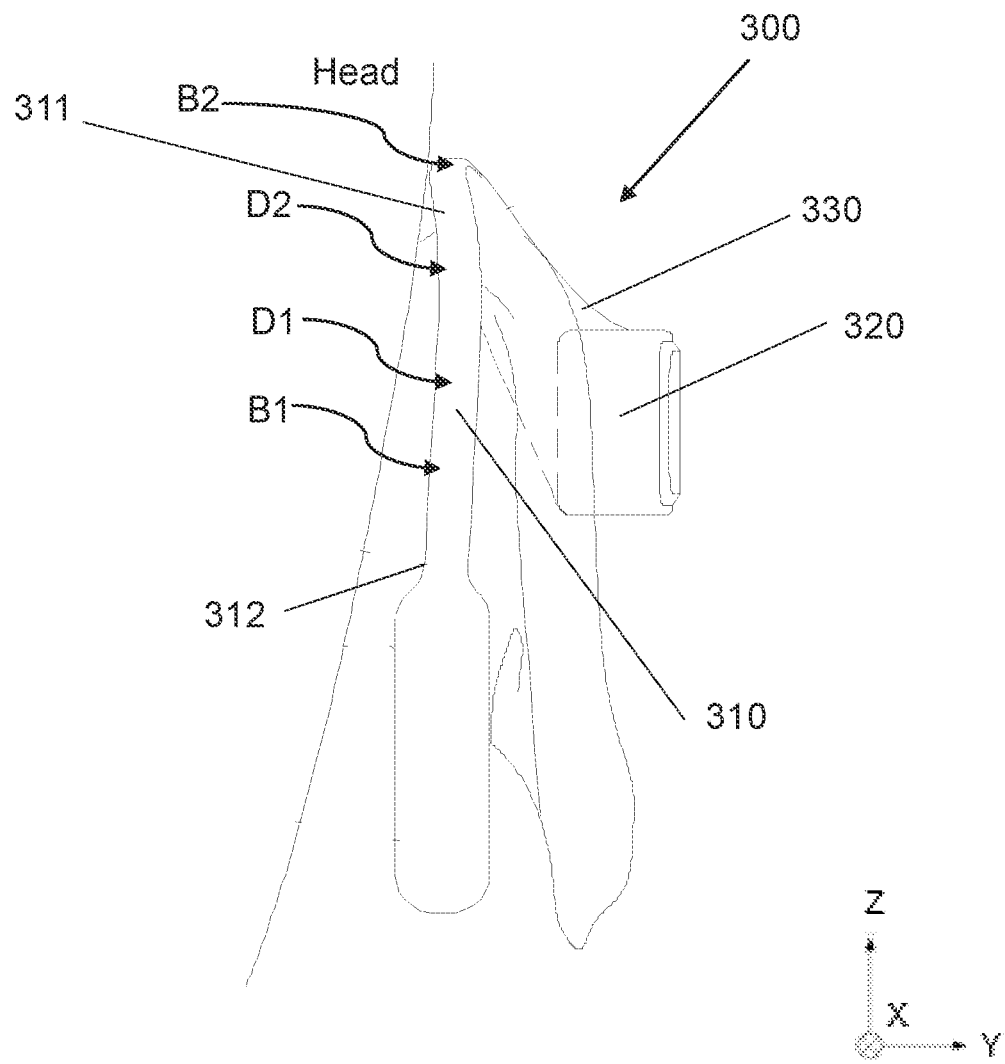
FIG. 6 is a schematic diagram illustrating a rear side view when a user is wearing an exemplary acoustic apparatus according to some embodiments of the present the present disclosure.

FIG. 6 is a schematic diagram illustrating a rear side view when a user is wearing an exemplary acoustic apparatus according to some embodiments of the present the present disclosure.

In some embodiments, referring to FIG. 6, when the user is wearing the acoustic apparatus 300, the hook-shaped part 310 may surround a first side of an ear (e.g., a back side of the ear) along a contour of the ear of the user. At least a portion of the first portion 311 of the hook-shaped part 310 may be in contact with the first side of the ear, so that the first portion 311 may have one or more contact regions (e.g., a first contact region B1, a second contact region B2, etc.) that are in contact with the first side of the ear, and one or more non-contact regions (e.g., a first non-contact region D1, a second non-contact region D2, etc.) that are not in contact with the first side of the ear.

In some embodiments, the first portion 311 may be bent toward the first side of the ear in an X-axis direction from a connection point between the first portion 311 and the connecting part 330 to a starting point of the second portion 312, so that the one or more contact regions may be formed on the first portion 311 to contact the first side of the ear. In some embodiments, the one or more contact regions formed on the first portion 311 may include a plurality of contact regions arranged at intervals. In some embodiments, the one or more contact regions (e.g., the second contact region B2) of the first portion 311 may include a first contact point, which may be the highest point (i.e., the first extremum point) of the first portion 311 when the user is wearing the acoustic apparatus 300. That is, the first contact point may coincide with the first extremum point. In some embodiments, the one or more contact regions of the first portion 311 may include a region where the first contact point is located, such as, an arc segment with an arc length of 3 mm near the first contact point. In some embodiments, the one or more contact regions (e.g., the first contact region B1) of the first portion 311 may also include a second contact point. In some embodiments, the second contact point may be a connection point between the first portion 311 and the second portion 312. In some embodiments, the second contact point may be a region where the second contact point is located, such as, an arc segment with an arc length of 5 mm near the second contact point. In some embodiments, the one or more contact regions of the first portion 311 may also include contact regions provided at other positions of the first portion 311, such as, a region of the first portion 311 corresponding to a relatively smooth position where the acoustic apparatus 300 is hung on the ear.

In some embodiments, each of the plurality of contact regions formed on the first portion 311 may have a contact area. The contact areas of different contact regions may be the same or different. In some embodiments, for different types of users, contact areas of a same contact region of the first portion 311 may be different. For example, when an adult male with relatively thick ears is wearing the acoustic apparatus 300, a contact area of the first contact region B1 on the first portion 311 may be larger than a contact area of the first contact region B1 on the first portion 311 when a minor with relatively thin ears is wearing the acoustic apparatus 300.

In some embodiments, the wearing comfort of the acoustic apparatus 300 may be improved by adjusting a count of the one or more contact regions on the hook-shaped part 310 contacting the ear or a total contact area of the one or more contact regions. In some embodiments, more contact regions contacting the ear or a larger total contact area may be disposed on the first portion 311 of the hook-shaped part 310, so that the pressing force of the acoustic apparatus 300 on the ear may be dispersed and act on different positions of the ear, thereby reducing the discomfort caused by the large local force (or pressure) on the ear, and improving the wearing comfort of the acoustic apparatus 300.

In some embodiments, due to the different shapes of the ears of different types of users, a surface of the hook-shaped part 310 corresponding the ear of any type of user may be difficult to be designed to completely fit the ear of the user. Therefore, the one or more non-contact regions that are not in contact with the first side of the ear may be disposed on the first portion 311, and the one or more non-contact regions may correspond to specific regions of the ears of different types of users to avoid a situation that the first portion 311 is held away from the ear due to difference(s) in ear shapes of different types of users, resulting in a smaller contact area between the first portion 311 and the ear. Therefore, different types of users may have a good comfort when the users are wearing the acoustic apparatus 300. In some embodiments, the one or more non-contact regions formed on the first portion 311 may include a plurality of non-contact regions (e.g., a first non-contact region D1 and a second non-contact region D2) arranged at intervals. In some embodiments, the first non-contact region D1 may be a position corresponding to a protrusion on the back side of the triangular fossa 104 when the user is wearing the acoustic apparatus 300. In some embodiments, the second non-contact region D2 may be a position corresponding to a protrusion on the back side of the cymba of auricular concha 103 when the user is wearing the acoustic apparatus 300. In some embodiments, the one or more contact regions formed on the first portion 311 that are in contact with the ear and the one or more non-contact regions that are not in contact with the ear may be distributed alternately in sequence. In some embodiments, by disposing the one or more contact regions and the one or more non-contact regions on the first portion 311, the pressing force of the first portion 311 on the first side of the ear may be taken into account, and the discomfort caused by a large local force (or pressure) in the specific regions of the ear of the user may be avoided simultaneously.

In some embodiments, the second portion 312 of the hook-shaped part 310 may be bent toward a surface of the first side of the ear in the X-axis direction from the starting point to the end point of the free end, so that one or more contact regions may be formed on the second portion 312 to contact the first side of the ear. In some embodiments, the one or more contact regions of the second portion 312 may include a third contact point. The third contact point may be a position of the second portion 312 corresponding to the second extremum point F. That is, the third contact point may coincide with the second extreme point. In some embodiments, the one or more contact regions of the second portion 312 may include a region where the third contact point is located, that is, a region where a point (e.g., a second inflection point) near the end point of the free end of the second portion 312 is located. It should be understood that the second contact point is a connection point between the first portion 311 and the second portion 312. Therefore, the one or more contact regions of the second portion 312 may also include the second contact point. In some embodiments, in order to ensure the stability of the second portion 312 in contact with the ear of the user, the one or more contact regions of the second portion 312 may further include a fourth contact point. The fourth contact point may be located between the second contact point and the third contact point. In some embodiments, in order to further improve the stability of the second portion 312 in contact with the ear of the user, the fourth contact point may be disposed closer to the third contact point. That is, the fourth contact point may be disposed between a midpoint of the second portion 312 and the third contact point. In some embodiments, the one or more contact regions of the second portion 312 may also include other positions of the second portion 312, such as, a region of the second portion 312 corresponding to a relatively smooth position where the acoustic apparatus 300 is hung on the ear.

In some embodiments, the second portion 312 of the hook-shaped part 310 may also be disposed with one or more non-contact regions that are not in contact with the ear. In some embodiments, the one or more non-contact regions on the second portion 312 may be disposed on a position of the second portion 312 corresponding to a protruding edge of the cavity of auricular concha on the first side of the ear when the user is wearing the acoustic apparatus 300. Exemplary positions of the one or more non-contact regions of the second portion 312 may include a region where a position of a point CP6 is located as shown in FIG. 3. In some embodiments, when the user is wearing the acoustic apparatus 300, it may be easy to cause the discomfort at the protruding edge of the cavity of auricular concha 102 on the first side of the ear. In this case, the one or more non-contact regions disposed on the position of the second portion 312 corresponding to the protruding edge of the cavity of auricular concha on the first side of the ear may prevent the acoustic apparatus 300 from contacting the protruding edge, thereby avoiding the discomfort at the protruding edge. In some embodiments, in order to take into account the wearing comfort of different types of users, an arc length of the one or more non-contact regions of the second portion 312 (e.g., the region where the position of the point CP6 is located) along an extending direction of the second portion 312 may be within a range from 1 mm to 3 mm. In some embodiments, the arc length of the one or more non-contact regions of the second portion 312 (e.g., the region where the position of the point CP6 is located) along an extending direction of the second portion 312 may be within a range from 1.5 mm to 2.5 mm. In some embodiments, the arc length of the one or more non-contact regions of the second portion 312 (e.g., the region where the position of the point CP6 is located) along an extending direction of the second portion 312 may be within a range from 1.8 mm to 2.2 mm.

In some embodiments, the one or more non-contact regions on the first portion 311 and/or the second portion 312 may provide a suitable space for the ear (especially the relatively thick ear), which may avoid squeezing the ear when the acoustic apparatus 300 is worn. However, when a distance between the one or more non-contact regions and the first side of the ear is relatively large, the wearing stability of the acoustic apparatus 300 may also be affected. Based on the effect, in some embodiments, in order to ensure the wearing stability of the acoustic apparatus 300, the distance between the one or more non-contact regions and the first side of the ear may not exceed 5 mm. In some embodiments, in order to ensure the wearing stability of the acoustic apparatus 300, the distance between the one or more non-contact regions and the first side of the ear may not exceed 4 mm. In some embodiments, in order to ensure the wearing stability of the acoustic apparatus 300, the distance between the one or more non-contact regions and the first side of the ear may not exceed 3 mm. In some embodiments, in order to ensure the wearing stability of the acoustic apparatus 300 and reduce a size of the acoustic apparatus 300, the distance between the one or more non-contact regions and the first side of the ear may not exceed 2 mm. In some embodiments, in order to ensure the wearing stability of the acoustic apparatus 300 and reduce the impact of the acoustic apparatus 300 on the head of the user, the distance between the one or more non-contact regions and the first side of the ear may not exceed 1.5 mm. In some embodiments, in order to further improve the wearing stability of the acoustic apparatus 300, the distance between the one or more non-contact region and the first side of the ear may not exceed 1 mm.

In some embodiments, by disposing the one or more contact regions that are in contact with the ear and the one or more non-contact regions that are not in contact with the ear on the hook-shaped part 310, the comfort of different types of users may be improved while taking into account the stability of the users when the users are wearing the acoustic apparatus 300.

In some embodiments, in order to improve the wearing stability of the acoustic apparatus 300, the second portion 312 may have a larger contact area with the ear of the user. In some embodiments, a contact length of a portion of the second portion 312 in contact with the first side of the ear may be proportional to a contact area of the portion of the second portion 312 in contact with the first side of the ear. For example, the longer the contact length of the portion of the second portion 312 in contact with the first side of the ear, the larger the contact area of the portion of the second portion 312 in contact with the first side of the ear. Since the second portion has an arc-shaped contact surface with the ear of the user, the larger the contact area of the portion of the second portion 312 in contact with the first side of the ear, the greater a total friction force of the second portion 312 on the first side of the ear.

In some embodiments, in order to increase the friction force of the second portion 312 on the first side of the ear and improve the wearing stability of the acoustic apparatus 300, the contact length of the portion of the second portion 312 in contact with the first side of the ear may exceed 70% of a total length of the second portion 312. In some embodiments, the contact length of the portion of the second portion 312 in contact with the first side of the ear may exceed 75% of the total length of the second portion 312. In some embodiments, the contact length of the portion of the second portion 312 in contact with the first side of the ear may exceed 80% of the total length of the second portion 312. In some embodiments, the contact length of the portion of the second portion 312 in contact with the first side of the ear may exceed 85% of the total length of the second portion 312. In some embodiments, the contact length of the portion of the second portion 312 in contact with the first side of the ear may exceed 90% of the total length of the second portion 312. In some embodiments, the contact length of the portion of the second portion 312 in contact with the first side of the ear may exceed 95% of the total length of the second portion 312. In some embodiments, the contact length of the second portion 312 in contact with the first side of the ear may be the total length of the second portion 312.

In some embodiments, the acoustic apparatus 300 may also include a plastic part (not shown in the figure) to improve the fitting effect of the acoustic apparatus on the ears of different groups of people, so that the acoustic apparatus may adapt to an ear contour of any group of people. The plastic part may be a structure that may undergo a plastic deformation when an external force acts on the plastic part. In some embodiments, the external force that causes the plastic part to be plastically deformed may be an acting force not greater than 30 N. In some embodiments, the external force that causes the plastic part to be plastically deformed may be an acting force not greater than 20 N. In some embodiments, the external force that causes the plastic part to be plastically deformed may be an acting force not greater than 10 N. In some embodiments, the external force that causes the plastic part to be plastically deformed may be an acting force no greater than 5 N. In some embodiments, the external force that causes the plastic part to be plastically deformed may be an acting force no greater than 1 N. In some embodiments, the external force that causes the plastic part to be plastically deformed may be an acting force not greater than 0.5 N.

In some embodiments, when the user is wearing the acoustic apparatus 300, the plastic part may be located between the ear and other structures of the acoustic apparatus 300. For example, the plastic part may be located between the first side of the ear and the hook-shaped part. As another example, the plastic part may be located between the second side of the ear and the holding part. When the acoustic apparatus is worn, the user may apply an external force, and a pressing force between the ear and the acoustic apparatus 300 may directly act on the plastic part, causing the plastic part to undergo the plastic deformation, so that the plastic part may be deformed into a shape conforming to the ear contour.

The plastic deformation may be a deformation that cannot be restored to an original shape. The plastic part may be deformed and a shape of the plastic part may be changed under the action of the external force, and after the external force disappears, a deformation amount of the plastic part may not be recovered or may only be partially recovered. A remaining part of the deformation that cannot be recovered may be a plastic deformation amount of the plastic part.

In some embodiments, the plastic part may be set to have a same curve as other structures (e.g., the hook-shaped part 310) of the acoustic apparatus 300. When the user is wearing the acoustic apparatus, one or more contact regions and one or more non-contact regions may be between the plastic part and the ear without the external force. That is, the acoustic apparatus may roughly fit the ear of the user but not completely fit at this time, so as to basically achieve the effect of the wearing comfort and wearing stability. When the user applies the external force (e.g., applying pressure) to the acoustic apparatus or the plastic part, the one or more contact regions between the plastic part and the ear may be first squeezed, and the one or more contact regions between the plastic part and the ear may be plastically deformed according to the ear contour of the user who actually wears the acoustic apparatus 300, until the one or more non-contact regions between the plastic part and the ear moves to fit the ear. In this way, the shape of the plastic part may be adjusted to fit the arc curve of the ear contour, so as to completely fit or nearly completely fit the ear of the target user. In some embodiments, after the external force is applied, a ratio of an area changed from the one or more non-contact regions to the one or more contact regions to an area of the one or more non-contact regions when no external force is applied may be greater than 50%. In some embodiments, after the external force is applied, the ratio of the area changed from the one or more non-contact regions to the one or more contact regions to the area of the one or more non-contact regions when no external force is applied may be greater than 70%. In some embodiments, after the external force is applied, the ratio of the area changed from the one or more non-contact regions to the one or more contact regions to the area of the one or more non-contact regions when no external force is applied may be greater than 90%. In some embodiments, after the external force is applied, the ratio of the area changed from the one or more non-contact regions to the one or more contact regions to the area of the one or more non-contact regions when no external force is applied may be 100%. Through such setting, the comfort and stability of the acoustic apparatus 300 may be greatly improved, which can effectively improve the experience of the user.

In some embodiments, in order to plastically deform the plastic part, the external force applied to the plastic part may need to be greater than a plastic deformation force of the plastic part. The plastic deformation force may be a critical force required for the plastic deformation of the plastic part. When a force acting on the plastic part is greater than or equal to the critical force, the plastic part may undergo the plastic deformation. When the force acting on the plastic part is less than the critical force, the plastic part may elastically deform or may not deform. In some embodiments, the plastic deformation force of the plastic part may be within a range from 0.1 N to 20 N. In some embodiments, the plastic deformation force of the plastic part may be within a range from 1 N to 15 N. In some embodiments, the plastic deformation force of the plastic part may be within a range from 1 N to 10 N. In some embodiments, the plastic deformation force of the plastic part may be within a range from 1 N to 5 N.

In some embodiments, a deformation recovery amount of the plastic deformation may be related to a plastic material selected for the plastic part. A plastic modulus of the plastic material may affect the deformation recovery amount of the plastic material after the plastic deformation. Generally speaking, the smaller the plastic modulus of the plastic material, the greater a plastic deformation ability, and the smaller the deformation recovery amount. In some embodiments, the deformation recovery amount of the plastic part after the plastic part is plastically deformed may be less than 20%. In some embodiments, the deformation recovery amount of the plastic part after the plastic part is plastically deformed may be less than 15%. In some embodiments, the deformation recovery amount of the plastic part after the plastic part is plastically deformed may be less than 10%. In some embodiments, the deformation recovery amount of the plastic part after the plastic part is plastically deformed may be less than 5%. In some embodiments, the deformation recovery amount of the plastic part after the plastic part is plastically deformed may be less than 1%.

In some embodiments, the material of the plastic part may include a polymer material, a clay material, or the like. In some embodiments, the polymer material may include polyethylene, polypropylene, polystyrene, or the like, or any combination thereof.

In some embodiments, the plastic part may be disposed on the hook-shaped part 310 of the acoustic apparatus 300. In some embodiments, the plastic part may be disposed on the first portion 311 and/or the second portion 312 of the hook-shaped part 310. In some embodiments, the plastic part may be disposed on the first portion 311 of the hook-shaped part 310. When the acoustic apparatus is in the wearing state, the first portion 311 of the hook-shaped part may be subjected to a greater pressing force than the second portion 312, and have fewer contact regions than the second portion 312. The comfort to the ear caused by the first portion 311 may be lower than that caused by the second section 312. When the plastic part is disposed on the first portion 311, after a pressure is applied to the plastic part, the plastic part may be plastically deformed according to the ear shape of the user who actually wears the acoustic apparatus 300, and may be adjusted to fit a curved shape of the ear contour, so that a relatively large proportion of the one or more non-contact regions in the first portion 311 may be turned into the contact region to complete fit or nearly complete fit with ear(s) of a target user.

In some embodiments, the plastic part may be disposed between the holding part 320 and the first portion 311 in a direction perpendicular to a sagittal plane of the user. In some embodiments, the plastic part may be disposed on an outer surface of the first portion 311 facing the holding part, so that the pressing force of the first portion 311 on the first side of the ear part may directly act on the plastic part.

In some embodiments, the plastic part may have a plurality of material forms. In different material forms, the plastic deformation forces required for the plastic deformation of the plastic part may be different. In some embodiments, the plastic deformation force of the plastic part may include a first plastic deformation force and a second plastic deformation force. The first plastic deformation force and the second plastic deformation force may be the plastic deformation forces of the plastic part in different material forms, respectively. In some embodiments, the material form of the plastic part may include a soft state that is easily deformed and a hard state that is difficult to deform. In some embodiments, the plastic deformation force of the plastic part corresponding to the soft state may be the first deformation force, and the plastic deformation force of the plastic part corresponding to the hard state may be the second deformation force. In some embodiments, when the plastic part satisfies a preset condition, the plastic part may realize a transformation of the material state, thereby changing the plastic deformation force of the plastic material. In some embodiments, when the preset condition is satisfied, the plastic part may change from the hard state to the soft state, and the plastic deformation force of the plastic part may change from the second plastic deformation force to the first plastic deformation force. In some embodiments, the first plastic deformation force may be within a range from 0.3 N to 10 N. In some embodiments, the first plastic deformation force may be within a range from 1 N to 5 N. In some embodiments, the first plastic deformation force may be within a range from 3 N to 5 N. In some embodiments, the second plastic deformation force may be within a range from 10 N to 100 N. In some embodiments, the second plastic deformation force may be within a range from 15 N to 80 N. In some embodiments, the second plastic deformation force may be within a range from 20 N to 70 N. In some embodiments, the second plastic deformation force may be within a range from 30 N to 60 N. When the preset condition is not satisfied, the plastic part may change from the soft state to the hard state, and the plastic deformation force of the plastic part may change from the first plastic deformation force to the second plastic deformation force.

In some embodiments, the preset condition may include a temperature condition. In some embodiments, when a temperature is higher than a threshold value, the plastic part may change from the hard state to the soft state. In some embodiments, a temperature threshold may be 45°. In some embodiments, the temperature threshold may be 50°. In some embodiments, the temperature threshold may be 55°. In some embodiments, the material of the plastic part may include a thermoplastic polymer material, including polyethylene, polypropylene, polyvinyl chloride, polystyrene, polyamide, polyoxymethylene, polycarbonate, polyphenylene ether, poly sulfone, rubber, plexiglass, nylon, or the like, or any combination thereof. In some embodiments, the material of the plastic part may also include other single or composite materials that can achieve the same performance.

In some embodiments, the plastic part of the acoustic apparatus may further include a resistance wire. The plastic material may wrap around the resistance wire. The resistance wire may heat the plastic material by means of electricity, so that the temperature of the plastic material may be higher than the threshold value, and the plastic part may change from the hard state to the soft state. After the resistance wire stops heating, the plastic material may cool naturally. When the temperature is lower than the threshold value, the plastic part may change from the soft state to the hard state. In some embodiments, the plastic material may directly wrap around the resistance wire. In some embodiments, an additional insulating material may be disposed between the plastic material and the resistance wire to wrap around the resistance wire to prevent the resistance wire from being exposed due to an excessive deformation of the plastic material during a plastic deformation process.

In some embodiments, an outer side of the plastic part of the acoustic apparatus may be coated with a skin-friendly material. When the user is wearing the acoustic apparatus, the skin-friendly material may contact the skin to improve the wearing comfort. In some embodiments, the skin-friendly material may be made of one or more materials. The composition of the skin-friendly material may be a material with a certain degree of adsorption and flexibility, such as, cotton, linen, wool fabric, silk fabric, silica gel, hand glue, etc. In some embodiments, the skin-friendly material may also be other single or composite materials that can achieve the same performance to achieve the wearing comfort.

In some embodiments, the acoustic apparatus may further include a control part for performing various control operations on the acoustic apparatus. In some embodiments, an operation mode of the control part may be a touch mode or a mechanical button mode. In some embodiments, the control part may include a control switch of the resistance wire. When the control switch is triggered, the resistance wire may be connected to a power source, so that the plastic part may be in a heating state, and the temperature may be increased. In some embodiments, the plastic part may further include a temperature detector for detecting the temperature of the plastic part. The control part may obtain temperature information of the temperature detector to automatically control a state of the control switch. When the temperature is higher than the threshold value, the control part may switch the control switch to an off state. At this time, the resistance wire may be disconnected from the power source, and the resistance wire may stop heating the plastic part. In some embodiments, the acoustic apparatus may further include a display part. When the temperature reaches the threshold value, the display part may generate an indication signal (e.g., a vibration signal or a light signal) to remind the user that the heating of the plastic part is completed. At this time, the user may put the acoustic apparatus on the ear and complete the plastic deformation of the plastic part by squeezing.

It should be noted that the control part may also include other control functions of the acoustic apparatus, such as, an internal voice of the acoustic apparatus, playing and/or pausing music, etc., which are not limited in some embodiments of the present disclosure.

Having thus described the basic concepts, it may be rather apparent to those skilled in the art after reading this detailed disclosure that the foregoing detailed disclosure is intended to be presented by way of example only and is not limiting. Although not expressly stated here, various modifications, improvements and amendments to this application may be made by those skilled in the art. Such modifications, improvements, and amendments are suggested in this application, so such modifications, improvements, and amendments still belong to the spirit and scope of the exemplary embodiments of this application.

Meanwhile, the present application uses specific words to describe the embodiments of the present application. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, certain features, structures or characteristics of one or more embodiments of the present application may be properly combined.

In addition, those skilled in the art can understand that various aspects of the present disclosure can be illustrated and described through several patentable categories or situations, including any new and useful processes, machines, products, or combinations of materials, or any new and useful improvements. Correspondingly, various aspects of the present application may be entirely executed by hardware, may be entirely executed by software (including firmware, resident software, microcode, etc.), or may be executed by a combination of hardware and software. The above hardware or software may be referred to as "block," "module," "engine," "unit," "component," or "system." Additionally, aspects of the present application may be embodied as a computer product comprising computer readable program code on one or more computer readable media.

The computer storage medium may include a propagation data signal containing a computer program encoding, such as on a baseband or as part of a carrier. The propagation signal may have a variety of expressions, including electromagnetic form, optical form, or suitable combination form. The computer storage medium may be any computer readable medium other than the computer readable storage medium, which can be used to perform system, apparatus, or apparatus to implement communication, propagating, or apparatus by connecting to an instruction. The program code located on the computer storage medium may be propagated through any suitable medium, including radio, cable, fiber optic cable, RF, or similar media, or any combination of the foregoing.

The computer program coding required for each part of each part can be written in any or more programming languages, including object-oriented programming languages such as Java, Scala, Smalltalk, Eiffel, Jade, Emerald, C++, VB.NET, Python, Python, etc., conventional programmatic programming languages such as C language, Visual Basic, Fortran 2003, Perl, Cobol 2002, PHP, ABAP, etc., dynamic programming languages such as Python, Ruby, or Groovy, or other programming languages. The program code may be completely run on the user's computer, run on the user's computer as a separate software package, partially run on the user's computer and partially run on the remote computer, or completely run on the remote computer or server. In the latter case, the remote computer can be connected to the user's computer through any network, such as a local region network (LAN) or a wide region network (WAN), or connected to an external computer (e.g., via the Internet), or in a cloud computing environment, or as a service Use such as software as a service (SaaS).

In addition, unless the claims are clearly stated, the order of the processing elements and sequences, the use of digital letters, or the use of other names described in the present disclosure are not used to limit the order and method of the present disclosure process and method. While the foregoing disclosure has discussed by way of various examples some embodiments of the invention that are presently believed to be useful, it should be understood that such detail is for illustrative purposes only and that the appended claims are not limited to the disclosed embodiments, but rather, the claims The claims are intended to cover all modifications and equivalent combinations that fall within the spirit and scope of the embodiments of the application. For example, although the system components described above may be implemented by hardware apparatus, they may also be implemented by a software-only solution, such as installing the described system on an existing server or mobile apparatus.

In the same way, it should be noted that in order to simplify the expression disclosed in the present application and help the understanding of one or more embodiments of the invention, in the foregoing description of the embodiments of the present application, sometimes multiple features are combined into one embodiment, drawings or descriptions thereof. This method of disclosure does not, however, imply that the subject matter of the application requires more features than are recited in the claims. Indeed, embodiment features are less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

For each patent, patent application, patent application publication, and other materials cited by the present disclosure, such as articles, books, specifications, publications, documents, etc., the entire contents are hereby incorporated into the present disclosure for reference. Application history documents that are inconsistent or conflicting with the contents of the present disclosure are excluded, and documents (currently or later attached to the present disclosure) that limit the widest range of the scope of the present disclosure are also excluded. It should be noted that if the description, definition, and/or terms used in the appended application of the present disclosure is inconsistent or conflicting with the content described in the present disclosure, the use of the description, definition and/or terms of the present disclosure shall prevail.

Finally, it should be understood that the embodiments described in this application are only used to illustrate the principles of the embodiments of this application. Other modifications are also possible within the scope of this application. Therefore, by way of example and not limitation, alternative configurations of the embodiments of the present application may be considered consistent with the teachings of the present application. Accordingly, the embodiments of the present application are not limited to the embodiments explicitly introduced and described in the present application.

What is claimed is:

1. An acoustic apparatus, comprising:
a hook-shaped part, a connecting part, and a holding part,
when a user is wearing the acoustic apparatus, the hook-shaped part being hung between a first side of an ear and a head of the user, the holding part being in contact with a second side of the ear, and the connecting part being connected with the hook-shaped part and the holding part; wherein
the hook-shaped part includes a first portion and a second portion, the first portion being connected with the connecting part, and the second portion being connected with the first portion;
a projection of the first portion on a sagittal plane of the user includes a first curve;
a projection of the second portion on the sagittal plane of the user includes a second curve;
the first curve includes a first extremum point in a first direction; and
the second curve includes a second extremum point in the first direction;
wherein the first direction is perpendicular to a horizontal plane of the user; and a connection point between the first curve and the second curve is an intersection point between a bottom edge of the holding part away from the connecting part along the first direction and a projection of the hook-shaped part on the sagittal plane of the user.

2. The acoustic apparatus of claim 1, wherein
the first extremum point is a maximum point of the first curve in the first direction; and
the second extremum point is a minimum point of the second curve in the first direction.

3. The acoustic apparatus of claim 1, wherein
when the user is wearing the acoustic apparatus,
a pressing force of the first portion on the first side of the ear is greater than a pressing force of the second portion on the first side of the ear, wherein
the projection of the first portion on the sagittal plane of the user and the projection of the holding part on the sagittal plane of the user include an overlapping portion, and
the hook-shaped part and the holding part cooperate with each other to provide pressing force facing the first side of the ear.

4. The acoustic apparatus of claim 1, wherein a first pressing force on the first side of the ear along a direction perpendicular to the sagittal plane of the user by a position on the hook-shaped part corresponding to the first extremum point is within a range from 0.05 N to 3 N.

5. The acoustic apparatus of claim 1, wherein a second pressing force on the first side of the ear along a direction perpendicular to a coronal plane of the user by a position on the hook-shaped part corresponding to the connection point between the first curve and the second curve is within a range from 0.05 N to 3 N.

6. The acoustic apparatus of claim 1, wherein a distance between a first edge of the holding part close to the first extremum point and the first extremum point in a projection on the sagittal plane of the user is within a range from 5 mm to 15 mm.

7. The acoustic apparatus of claim 1, wherein a contact region includes at least a first contact point, a second contact point, and a third contact point; wherein
the first contact point coincides with the first extremum point, the second contact point coincides with the connection point between the first curve and the second curve, and the third contact point coincides with the second extremum point.

8. The acoustic apparatus of claim 7, wherein the first portion includes one or more contact regions that are in contact with the first side of the ear and one or more non-contact regions that are not in contact with the first side of the ear.

9. The acoustic apparatus of claim 8, wherein a distance between each of the one or more non-contact regions and the first side of the ear is less than or equal to 5 mm.

10. The acoustic apparatus of claim 7, wherein a contact region of the second portion in contact with the first side of the ear further includes a fourth contact point, and the fourth contact point is located between the connection point between the first curve and the second curve and the second extremum point.

11. The acoustic apparatus of claim 1, wherein a size of the connecting part along the first direction is within a range from 0.56 mm to 4.56 mm.

12. The acoustic apparatus of claim 1, wherein a size of the connecting part along the direction perpendicular to the sagittal plane of the user is within a range from 2.5 mm to 4.5 mm.

13. The acoustic apparatus of claim 1, further comprising:
a plastic part capable of being plastically deformed to fit the ear of the user.

14. The acoustic apparatus of claim 13, wherein the plastic part is disposed on the first portion of the hook-shaped part.

15. The acoustic apparatus of claim 14, wherein the plastic part is located between the holding part and the first portion in the direction perpendicular to the sagittal plane of the user.

16. The acoustic apparatus of claim 13, wherein the plastic part has a plastic deformation force, wherein
when a force on the plastic part exceeds the plastic deformation force, the plastic part undergoes a plastic deformation, and a deformation recovery amount of the plastic deformation is less than 20%.

17. The acoustic apparatus of claim 16, wherein the plastic deformation force includes a first plastic deformation force, and the first plastic deformation force is within a range from 0.3 N to 10 N.

18. The acoustic apparatus of claim 17, wherein the plastic deformation force includes a second plastic deformation force, and the second plastic deformation force is within a range from 10 N to 100 N.

19. The acoustic apparatus of claim 18, wherein when the plastic part satisfies a preset condition, the plastic deformation force is transformed from the second plastic deformation force to the first plastic deformation force.

20. The acoustic apparatus of claim 13, wherein a material of the plastic part includes a thermoplastic polymer material.

* * * * *